(12) United States Patent
Kim et al.

(10) Patent No.: US 11,358,882 B2
(45) Date of Patent: Jun. 14, 2022

(54) WATER IONIZER INCLUDING STACKED ELECTROLYZER AND FLOW SWITCHING DEVICE, WITH INLET BEING SEPARATE FROM OUTLET

(71) Applicant: ALKAMEDI CO., LTD., Anyang-si (KR)

(72) Inventors: Ki Hwan Kim, Busan (KR); Jong Seob Kim, Anyang-si (KR)

(73) Assignee: ALKAMEDI CO., LTD., Anyang-si (KR)

(*) Notice: Subject to any disclaimer, the term of this patent is extended or adjusted under 35 U.S.C. 154(b) by 327 days.

(21) Appl. No.: 16/636,082

(22) PCT Filed: Nov. 12, 2019

(86) PCT No.: PCT/KR2019/015293
§ 371 (c)(1),
(2) Date: Feb. 3, 2020

(87) PCT Pub. No.: WO2020/111573
PCT Pub. Date: Jun. 4, 2020

(65) Prior Publication Data
US 2021/0061681 A1    Mar. 4, 2021

(30) Foreign Application Priority Data

Nov. 27, 2018 (KR) .......................... 10-2018-0147944

(51) Int. Cl.
*C25B 1/04* (2021.01)
*C02F 1/461* (2006.01)

(52) U.S. Cl.
CPC ...... *C02F 1/4618* (2013.01); *C02F 2201/005* (2013.01); *C02F 2201/4611* (2013.01);
(Continued)

(58) Field of Classification Search
CPC .. C25B 1/04; C25B 3/25; C25B 15/02; C25B 9/70; C25B 11/00; C25B 9/65;
(Continued)

(56) References Cited

U.S. PATENT DOCUMENTS 6,846,394 B2 * 1/2005 Kweon ................. C02F 1/4618
204/275.1

FOREIGN PATENT DOCUMENTS

KR    10-0844394 B1    7/2008

* cited by examiner

*Primary Examiner* — Zulmariam Mendez
(74) *Attorney, Agent, or Firm* — Goldilocks Zone IP Law

(57) ABSTRACT

A water ionizer includes a stacked electrolyzer and a flow switching device, with an inlet being separate from an outlet. Water entering an input regulator is distributed at a predetermined ratio before being supplied to an electrolyzer module to minimize acidic water to be discarded. Water supplied from the input regulator is directed to pass through the electrolyzer module in a crossing manner to delay flows of water to improve the efficiency of electrolysis. Electrolyzer cells are stacked on and fitted to each other to simplify an assembly process and improve convenience. Electrode plates of the electrolyzer module are fixedly fitted into a frame to facilitate an assembly process and improve a fabrication process. The input regulator and a flow switching output unit are connected via a connecting shaft to synchronize the operations thereof to obtain reliability.

10 Claims, 24 Drawing Sheets

(52) U.S. Cl.
CPC ............... *C02F 2201/46115* (2013.01); *C02F 2201/46165* (2013.01)

(58) Field of Classification Search
CPC ....... C25B 9/015; C25B 9/40; C02F 1/46109; C02F 1/46104; C02F 1/461; C02F 1/4618; C02F 2201/4612; C02F 2201/46165
See application file for complete search history.

WATER IONIZER INCLUDING STACKED ELECTROLYZER AND FLOW SWITCHING DEVICE, WITH INLET BEING SEPARATE FROM OUTLET

CROSS REFERENCE TO RELATED APPLICATION

This application claims the benefit under 35 U.S.C. Section 371, of PCT International Application No. PCT/KR2019/015293, Nov. 12, 2019 filed, which claimed priority to Korean Patent Application No. KR 10-2018-0147944, filed Nov. 27, 2018, the disclosures of which are hereby incorporated by the references.

BACKGROUND OF THE INVENTION

Field of the Invention

The present invention relates generally to a water ionizer and, more particularly, to a water ionizer including a stacked electrolyzer and a flow switching device, with an inlet being separate from an outlet, in which water entering an input regulator is distributed at a predetermined ratio before being supplied to an electrolyzer module so as to minimize an unnecessary amount of acidic water to be discarded, water supplied from the input regulator is directed to pass through the electrolyzer module in a crossing manner to delay flows of water so as to improve the efficiency of electrolysis, as many electrolyzer cells as the intended number of electrodes are stacked on and fitted to each other so as to simplify an assembly process and improve convenience according to user conditions, electrode plates of the electrolyzer module are fixedly fitted into a frame so as to facilitate an assembly process and improve a fabrication process due to the removal of insert molding, and the input regulator and a flow switching output unit are connected via a connecting shaft to synchronize the operation of the input regulator and the operation of the flow switching output unit so as to obtain reliability.

DESCRIPTION OF THE RELATED ART

In general, an alkaline water ionizer is a device producing clean water by purifying tap water, as well as producing alkaline water (or alkaline reduced water) and acidic water through electrolysis.

Such an alkaline water ionizer receives tap water through a solenoid valve, allows received water to pass through an internal filter, and delivers filtered water to an electrolyzer through a flow rate sensor.

Then, filtered tap water is subjected to electrolysis within the electrolyzer inside of the water ionizer. Created water may be pure neutral water if pH, a symbol indicating a hydrogen ion index, is 7, acidic water if pH is smaller than 7, and alkaline water if pH is greater than 7.

In such ionized water (electrolytic water), slightly alkaline water is widely used due to its characteristics. That is, when drunk, ionized water may promote the metabolism of the human body. Slightly alkaline water may be effective to treatment of gastrointestinal symptoms, such as chronic diarrhea, indigestion, abnormal fermentation in the stomach, and excess acid in the stomach. In addition, strong alkaline water is able to promote the growth of crops and improve soil, and is also used to clean dirty objects without using a synthetic cleaner.

In addition, acidic water is generally used for sterilization. Acidic water is used widely for sterilization, for example, sterilization in food manufacturing processing, deodorization in the livestock industry, and disinfection.

A variety of water ionizers for effectively producing ionized water have been developed. The applicant has been patented a flow switching device of an electrolyzer having an automatic polarity change function as Korean Patent No. 10-0844394.

Alkaline water and acidic water are created by electrolyzing water introduced through an inlet using an electrode plate. A flow switching valve fixed to a housing is configured to set alkaline water, acidic water, and clean water (or purified water), discharged through discharge passages, to flow in three directions.

However, according to the patented solution, tap water is supplied through a single inlet. Due to the orifice difference occurring when tap water is introduced to two chambers of the electrolzyer, tap water may flow backwards. This may disadvantageously lower the reliability of the product to consumers.

In addition, since tap water supplied to the electrolzyer is divided into alkaline water and acidic water by electrolysis and then is directly discharged through a flow switching valve, the efficiency of electrolysis is disadvantageously lowered.

In addition, since the electrode plate of the electrolzyer is fabricated by insert molding, a fabrication process is complicated. In the replacement of the electrode plate plated with platinum (Pt), replacement costs are significantly expensive, which is problematic.

The information disclosed in the Background of the Invention section is only for the enhancement of understanding of the background of the invention, and should not be taken as an acknowledgment or as any form of suggestion that this information forms a prior art that would already be known to a person skilled in the art.

RELATED ART DOCUMENT

Patent Document 1: Korean Patent No. 10-0844394 (Jul. 1, 2008)

SUMMARY OF THE INVENTION

Accordingly, the present invention has been made keeping in mind the above problems occurring in the related art, and the present invention proposes a water ionizer including a stacked electrolyzer and a flow switching device, with an inlet being separate from an outlet, in which water entering an input regulator is distributed at a predetermined ratio before being supplied to an electrolyzer module, such that an unnecessary amount of acidic water to be discarded is minimized, so that the water ionizer can be used as being environmentally friendly.

Also proposed is a water ionizer including a stacked electrolyzer and a flow switching device, with an inlet being separate from an outlet, in which water supplied from the input regulator is directed to pass through the electrolyzer module in a crossing manner to delay flows of water, thereby improving the efficiency of electrolysis.

Also proposed is a water ionizer including a stacked electrolyzer and a flow switching device, with an inlet being separate from an outlet, in which polarities of voltages applied to electrode plates are changed so that anode chambers and cathode chambers repeatedly alternate with each other, thereby preventing scale in the anode chambers.

Also proposed is a water ionizer including a stacked electrolyzer and a flow switching device, with an inlet being separate from an outlet, in which three or more electrolyzer cells or as many electrolyzer cells as the intended number of electrodes can be stacked on and fitted to each other, at the request of customers, so that an assembly process is simplified and convenience is improved according to user conditions.

Also proposed is a water ionizer including a stacked electrolyzer and a flow switching device, with an inlet being separate from an outlet, in which electrode plates of the electrolyzer module are fixedly fitted into a frame, so that an assembly process is facilitated and a fabrication process is significantly improved due to the removal of insert molding.

Also proposed is a water ionizer including a stacked electrolyzer and a flow switching device, with an inlet being separate from an outlet, in which the input regulator and a flow switching output unit are connected via a connecting shaft, so that the operation of the input regulator and the operation of the flow switching output unit are synchronized, thereby obtaining reliability.

In order to achieve the above objective, according to one aspect of the present invention, a water ionizer may include: an input regulator distributing water, supplied through a filter and a flow rate sensor, to a first inlet and a second inlet of a stacked electrolyzer; an electrolyzer module fixed to a first supply pipe and a second supply pipe of the input regulator to guide water supplied from the input regulator in a crossing manner and electrolyze water into alkaline water and acidic water, wherein water introduced to the first inlet is discharged from a second outlet and water introduced to the second inlet is discharged from a first outlet; a flow switching output unit fixed to an upper portion of the electrolyzer module, wherein an output separator of the flow switching output unit rotates in response to an operation of a drive motor to distribute alkaline water and acidic water at a predetermined ratio so as to be discharged through an alkaline water outlet and an acidic water outlet, respectively; and a connecting shaft disposed in the input regulator and the flow switching output unit to synchronize operations of the input regulator and the flow switching output unit in response to an operation of a motor.

In addition, the input regulator may include: an input body; a rotatable supply member disposed within the input body to rotate in response to an operation of the connecting shaft, with a supply passage being provided in one portion of the rotatable supply member and a supply restraining member being provided in the other portion of the rotatable supply member; and a cover fixed to an upper portion of the input body to close the input body. A coupling hole may be provided in a central portion of the cover, the coupling hole allowing the connecting shaft to be coupled thereto. A water supply hole may be provided at a side of the coupling hole, the water supply hole supplying water into the input body. The inlets may be separate from the outlets.

Here, the input body may include: a distribution space in which water, supplied from the water supply hole, is distributed at a predetermined ratio; a first supply pipe having a first supply hole to supply water, supplied to the distribution space, to the first inlet of the electrolyzer module; a second supply pipe having a second supply hole to supply water, supplied to the distribution space, to the second inlet of the electrolyzer module; a discharge hole provided in a lower portion of the distribution space to extend through the bottom portion.

In addition, the electrolyzer module may include: a front plate having first and second inlets provided in a lower portion thereof and first and second outlets provided in an upper portion thereof, the front plate allowing water supplied from the input regulator to be discharged to the flow switching output unit; a rear plate disposed behind the front plate; three or more electrolyzer cells stacked between the front plate and the rear plate to electrolyze water while providing crossing flows of water using first and second inlet holes and first and second passage holes provided in a staggered arrangement; and terminals disposed on lower portions of the front plate and the electrolyzer cells to supply a voltage to electrode plates of the electrolyzer cells.

In addition, each of the electrolyzer cells may include: a frame; a water stop packing disposed in a front portion of the frame to direct water, introduced through the first inlet hole, to the first passage hole and to direct water, introduced through the second inlet hole, to the second passage hole; the electrode plate located in front of the frame and fixedly coupled to a coupling hole of the frame; a diaphragm located behind the frame; and a fixing frame fixing the diaphragm to the frame.

The frame may be configured such that the first and second inlet holes are provided in both lower portions, the first and second passage holes are provided in both upper portions, and the coupling hole to which the electrode plate is coupled is provided between the first and second inlet holes.

In addition, the flow switching output unit may include: a connecting pipe including a first discharge pipe fixed to a first outlet of the electrolyzer module and a second discharge pipe fixed to a second outlet of the electrolyzer module; a housing fixed to a front portion of the connecting pipe, and having the alkaline water outlet and the acidic water outlet through which alkaline water and acidic water are discharged; the output separator distributing alkaline water and acidic water, supplied to an accommodation space of the housing, at the predetermined ratio to be discharged through the alkaline water outlet and the acidic water outlet or discharging clean water through the alkaline water outlet; a drive motor having a rotary shaft rotating a camp shaft of the output separator; and first and second, and third micro switches determining directions in which alkaline water, acidic water, and clean water are discharged, in response to a rotation of a rotary disc driven by the drive motor.

Here, the housing may include: an outlet body discharging acidic water and alkaline water, supplied thereto, through the connecting pipe; an upper cap disposed on an upper portion of the outlet body to fix the cam shaft; and a lower cap disposed on a lower portion of the outlet body to fix the cam shaft, and having a shaft insertion hole to which the connecting shaft is coupled.

The outlet body may include: first and second gates communicating with the first and second outlets of the electrolyzer module; a first discharge hole aligned collinearly with and communicating with the first and second gates, such that acidic water is discharged through the first discharge hole; a second discharge hole disposed opposite to the first discharge hole, and aligned collinearly with and communicating with the first and second gates, such that alkaline water or clean water is discharged through the second discharge hole; and an alkaline water outlet and an acidic water outlet communicating with the first and second discharge holes to discharge alkaline water and acidic water, respectively.

The output separator may include: a cam shaft connected to the rotary shaft of the drive motor and the connecting shaft, and having an upper pressing protrusion and a lower pressing protrusion provided in different directions; an upper water stop member, wherein the upper pressing protrusion of the cam shaft is located on an inner circumferential surface of the upper water stop member, and the upper water stop member has a first water stop cap provided on one portion and a second water stop cap provided on the other portion; a lower water stop member, wherein the lower pressing protrusion of the cam shaft is located on an inner circumferential surface of the upper water stop member, and the lower water stop member has a first water stop cap provided on one portion and a second water stop cap provided on the other portion; and the rotary disc disposed on an upper end portion of the cam shaft, and having pressing protrusions to press contact pieces of the first and second, and third micro switches.

The connecting shaft may include: an upper connecting member coupled to the cam shaft of the flow switching output unit; a lower connecting member coupled to the rotatable supply member of the input regulator; and a spring disposed between the upper connecting member and the lower connecting member to elastically fix the lower connecting member to the rotatable supply member.

According to the present invention, which water entering an input regulator is distributed at a predetermined ratio before being supplied to an electrolyzer module, such that an unnecessary amount of acidic water to be discarded is minimized, so that the water ionizer can be used being environmentally friendly.

In addition, water supplied from the input regulator is directed to pass through the electrolyzer module in a crossing manner to delay flows of water, thereby improving the efficiency of electrolysis.

In addition, polarities of voltages applied to electrode plates are changed so that anode chambers and cathode changers repeatedly alternate with each other, thereby preventing scale in the anode chambers.

In addition, three or more electrolyzer cells or as many electrolyzer cells as the intended number of electrodes can be stacked on and fitted to each other, at the request of customers, so that an assembly process is simplified and convenience is improved according to user conditions.

In addition, electrode plates of the electrolyzer module are fixedly fitted into a frame, so that an assembly process is facilitated and a fabrication process is significantly improved due to the removal of insert molding.

In addition, the input regulator and a flow switching output unit are connected via a connecting shaft, so that the operation of the input regulator and the operation of the flow switching output unit are synchronized, thereby obtaining reliability.

BRIEF DESCRIPTION OF THE DRAWINGS

The above and other objectives, features, and advantages of the present invention will be more clearly understood from the following detailed description when taken in conjunction with the accompanying drawings, in which.

DETAILED DESCRIPTION OF THE INVENTION

Figure 1:
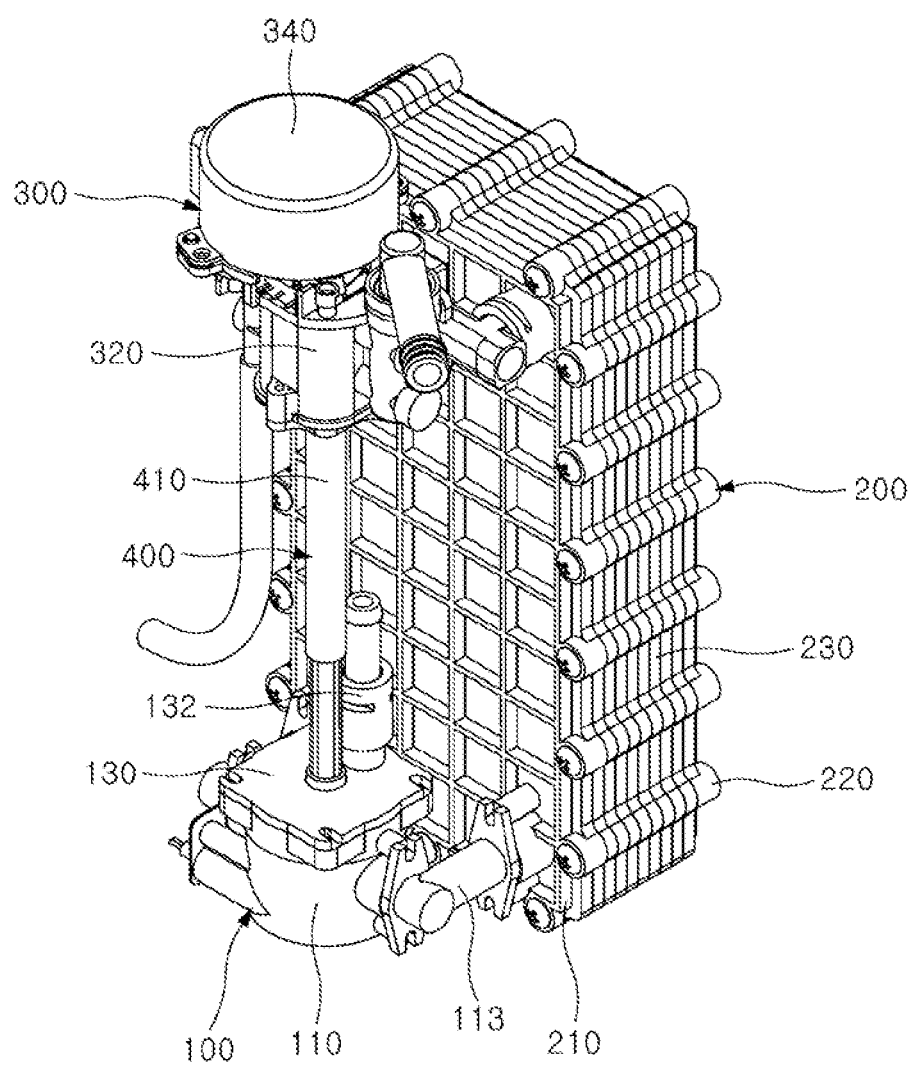
FIG. 1 is a perspective view illustrating a water ionizer according to the present invention.
Figure 2:
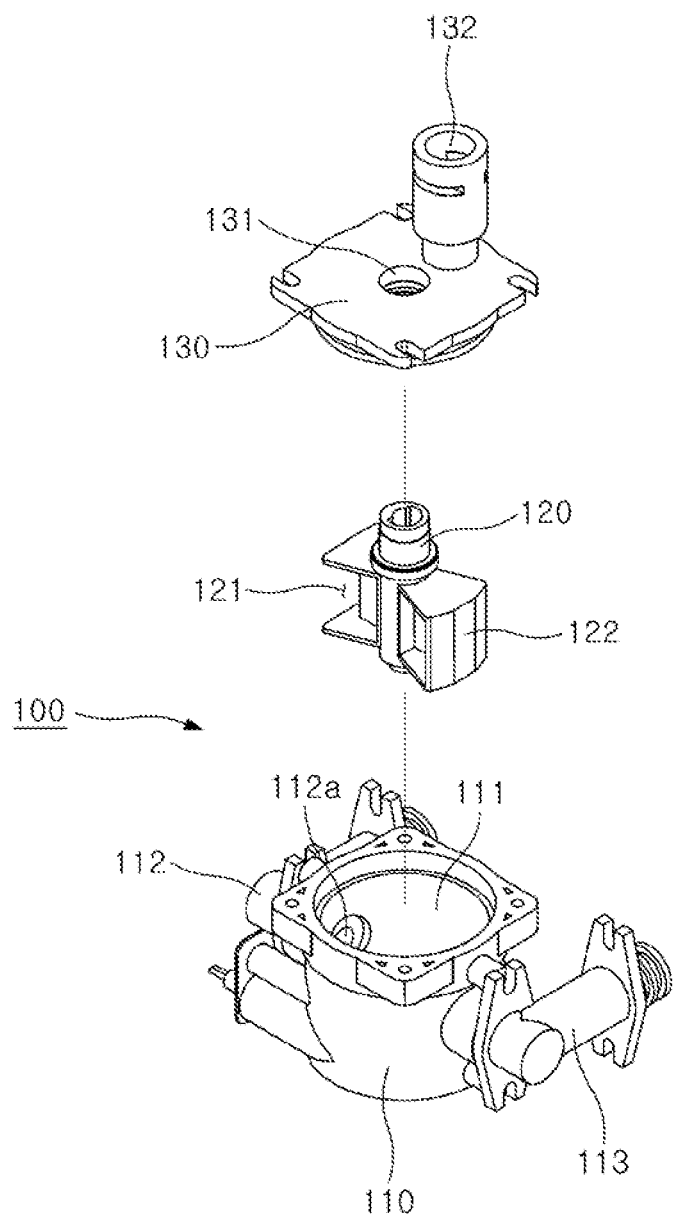
FIG. 2 is an exploded perspective view of the input regulator according to the present invention.
Figure 3:
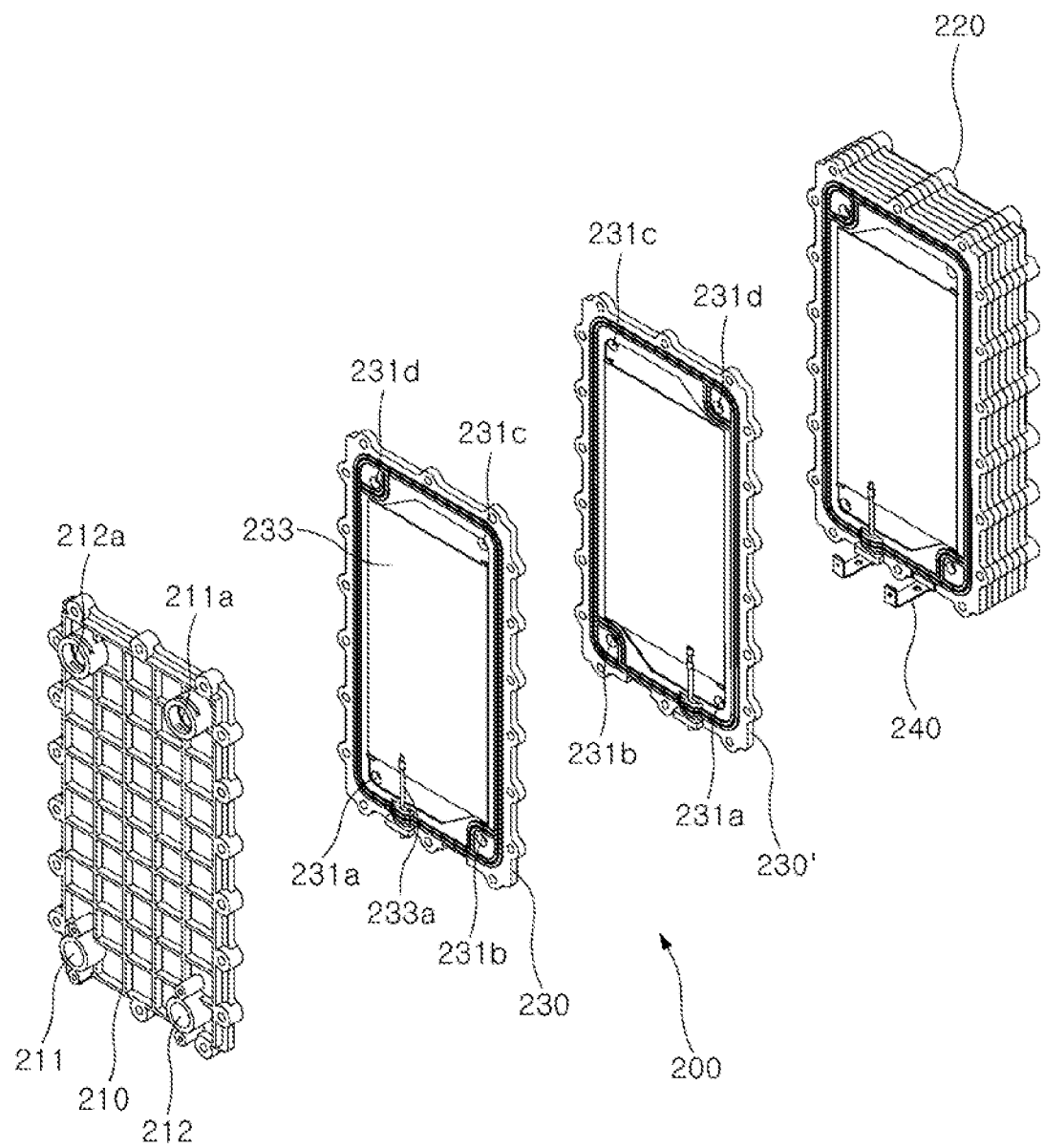
FIG. 3 is an exploded perspective view of the electrolyzer module according to the present invention.
Figure 4:
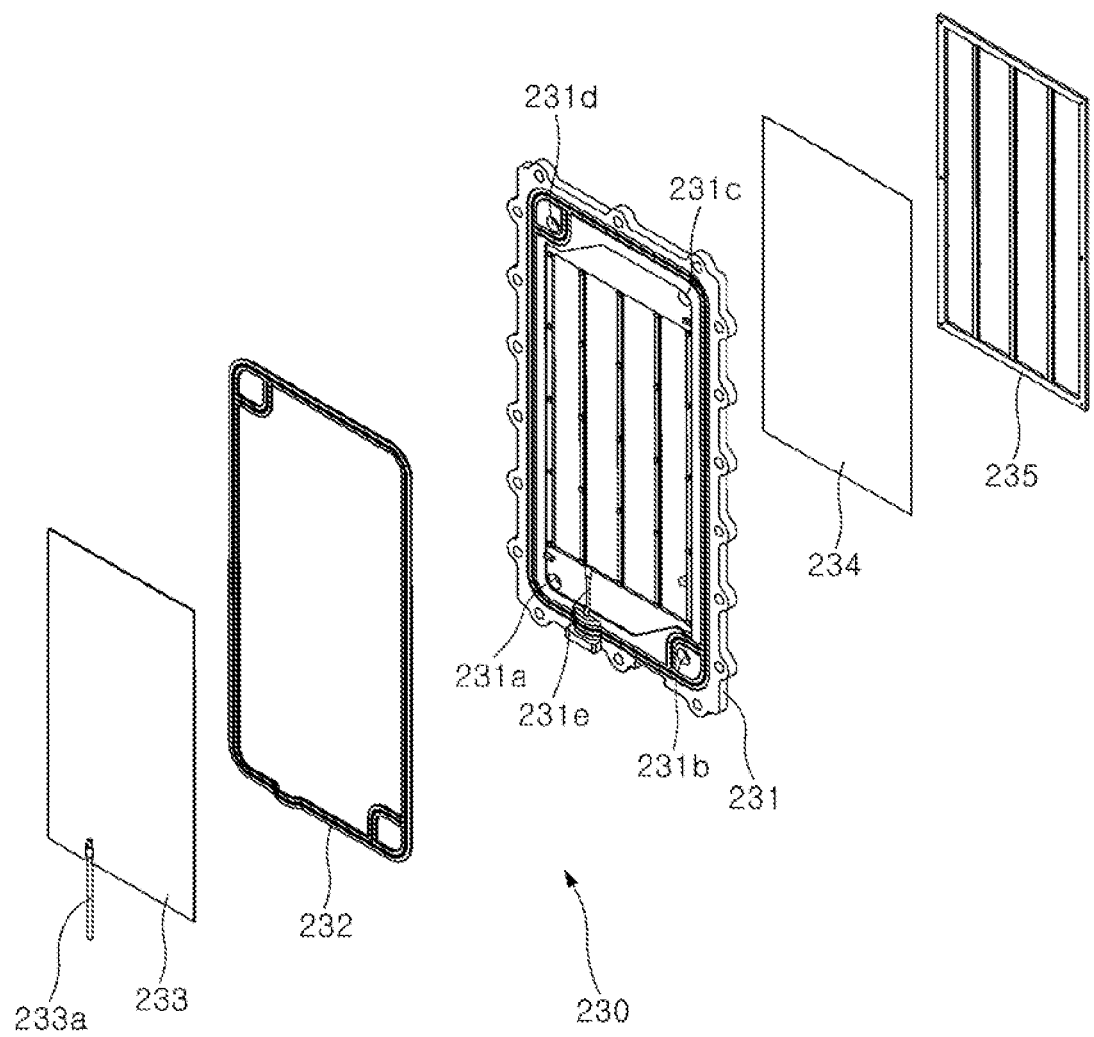
FIG. 4 is an exploded perspective view of the electrolyzer cell according to the present invention.
Figure 5:
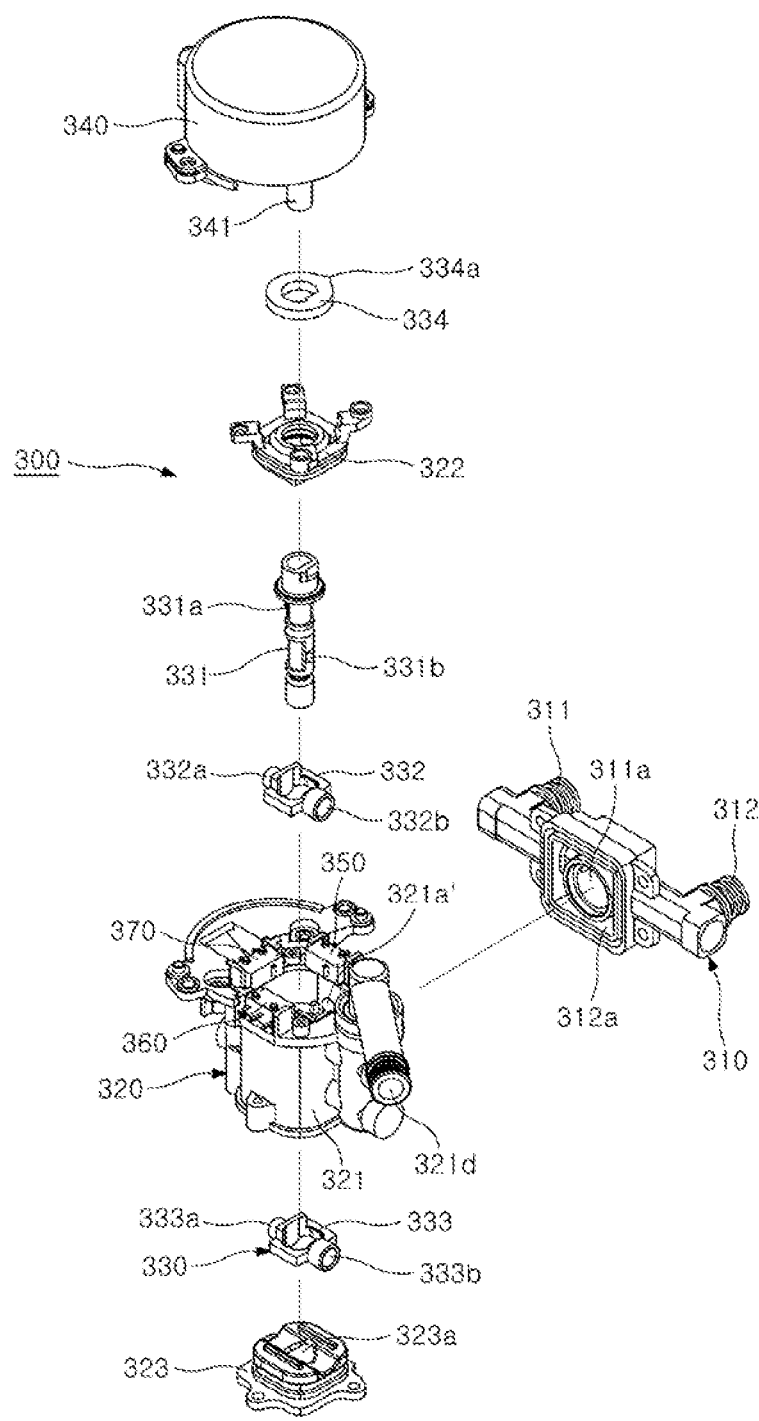
FIG. 5 is an exploded perspective view of the flow switching output unit according to the present invention.
Figure 6:
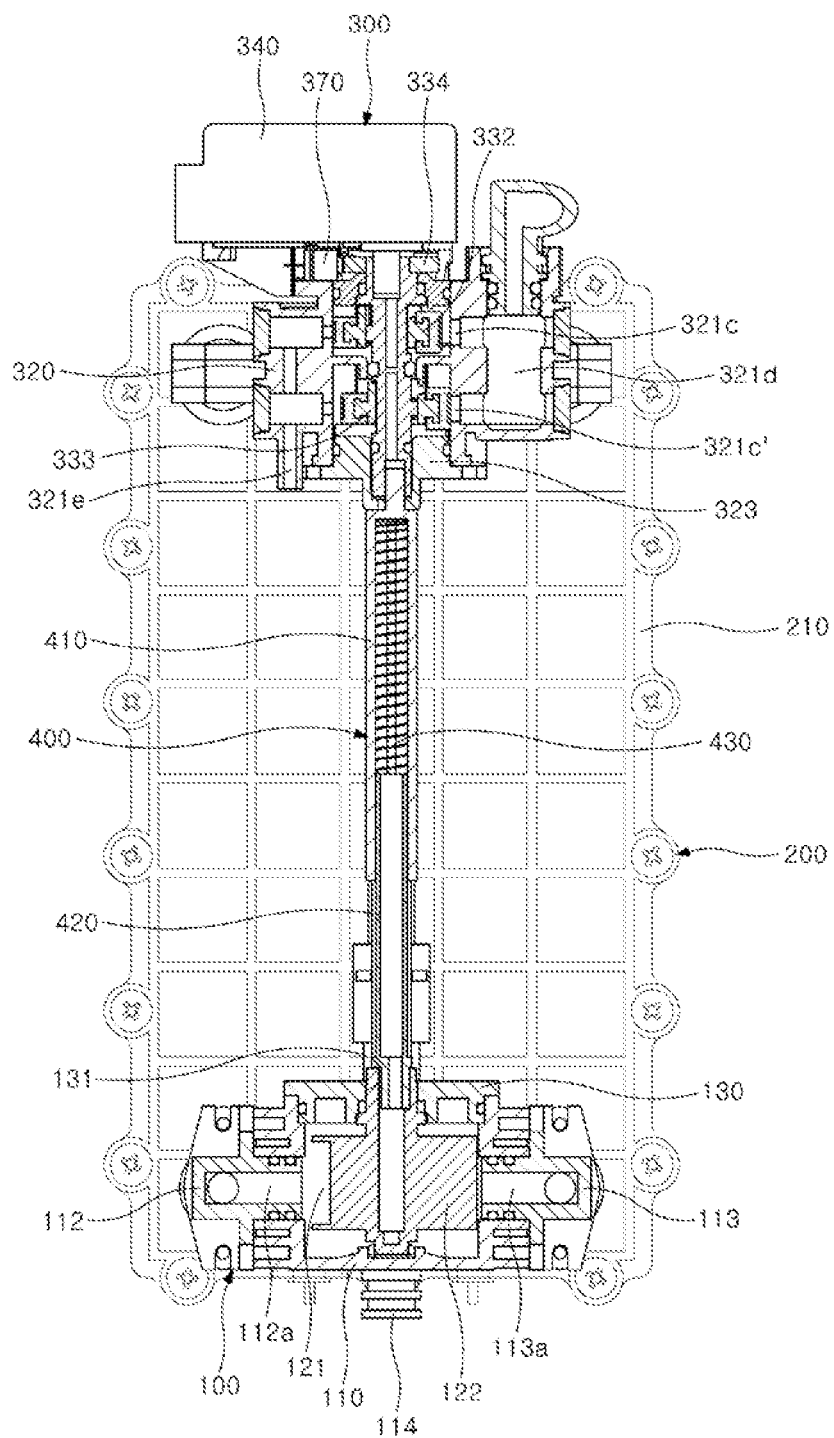
FIG. 6 is a front view illustrating a configuration of the water ionizer according to the present invention.
Figure 7:
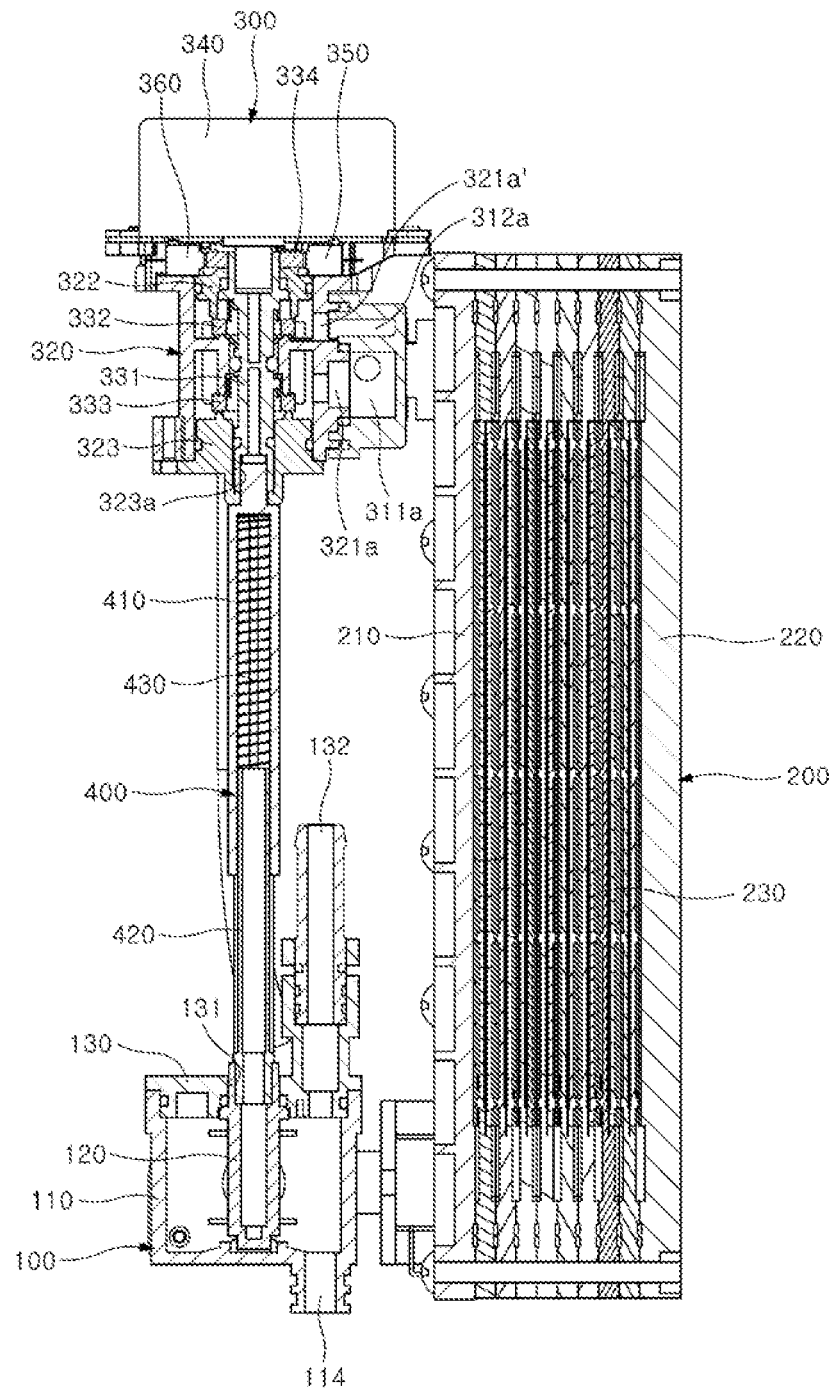
FIG. 7 is a side view illustrating the configuration of the water ionizer according to the present invention.

Hereinafter, a water ionizer including a stacked electrolyzer and a flow switching device, with an inlet being separate from an outlet, according to exemplary embodiments of the present invention will be described in detail with reference to the accompanying drawings. In the following description of the present invention, a detailed description of known functions and configurations incorporated herein will be omitted in the situation in which the subject matter of the present invention may be rendered rather unclear thereby. The terms to be used hereinafter are defined in consideration of functions thereof in embodiments of the present invention, but may vary depending on the intentions of users or operators, as well as practices. Therefore, the terms shall be defined on the basis of the description throughout the specification.

First, as illustrated in FIGS. 2 to 7, the water ionizer according to the present invention includes an input regulator 100, an electrolyzer module 200, a flow switching output unit 300, and a connecting shaft 400.

In the input regulator 100, a first supply pipe 112 having a first supply hole 112a is fixed to one side portion of an input body 110 into which water is introduced, and a second supply pipe 113 having a second supply hole 113a is fixed to the other side portion of the input body 110.

A discharge hole 114 is formed in the lower portion of the input body 110. The discharge hole 114 allows water discharged from inside the water ionizer to be discharged through a discharge pipe.

A rotatable supply member 120 is disposed in a distribution space of the input body 110. The rotatable supply member 120 has a supply passage 121 provided in one portion and a supply restraining member 122 provided in the other portion to supply water by distributing water at a predetermined ratio.

A cover 130 is fixed to the upper portion of the input body 110 to close the input body 110. The cover 130 has a water supply hole 132 through which water is supplied from a flow rate sensor and a coupling hole 131 to which the connecting shaft 400 is coupled.

The central lower portion of the rotatable supply member 120 is seated on the inner lower portion of the input body 110. The central upper portion of the rotatable supply member 120 is rotatably coupled to the coupling hole 131 of the cover 130.

In addition, the electrolyzer module 200 electrolyzing water supplied from the input regulator 100 is fixed to the first and second supply pipes 112 and 113.

First and second inlets 211 and 212 are provided on a front plate 210 of the electrolyzer module 200 while extending through the front plate 210. The first inlet 211 is fixed to the first supply hole 112a of the input regulator 100, while the second inlet 212 is fixed to the second supply pipe 113 of the input regulator 100.

First and second water outlets 212a and 211a are provided on upper portions of the front plate 210 while extending through the front plate 210. The first water outlet 212a is fixed to a first discharge pipe 311, while the second water outlet 211a is fixed to a second discharge pipe 312.

Three or more electrolyzer cells are sequentially stacked and fixed at the rear of the front plate 210. The electrolyzer cells include one or more electrolyzer cells 230 of a cathode chamber in which alkaline water is created and one or more electrolyzer cells 230' of an anode chamber in which acidic water is created.

The electrolyzer cells 230 and 230' respectively include a frame 231, a water stop packing 232, an electrode plate 233, a diaphragm 234, and a fixing frame 235.

First and second inlet holes 231a and 231b are formed in the lower portion of the frame 231. The first inlet hole 231a communicates with the first inlet 211 of the front plate 210, while the second inlet hole 231b communicates with the second inlet 212 of the front plate 210.

First and second passage holes 231c and 231d are formed in the upper portion of the frame 231. The first passage hole 231c communicates with the first water outlet 212a, while the second passage hole 231d communicates with the second water outlet 211a.

The water stop packing 232 is disposed on the frame 231, such that the first inlet hole 231a communicates with the first passage hole 231c, and the second inlet hole 231b communicates with the second passage hole 231d.

Figure 8:
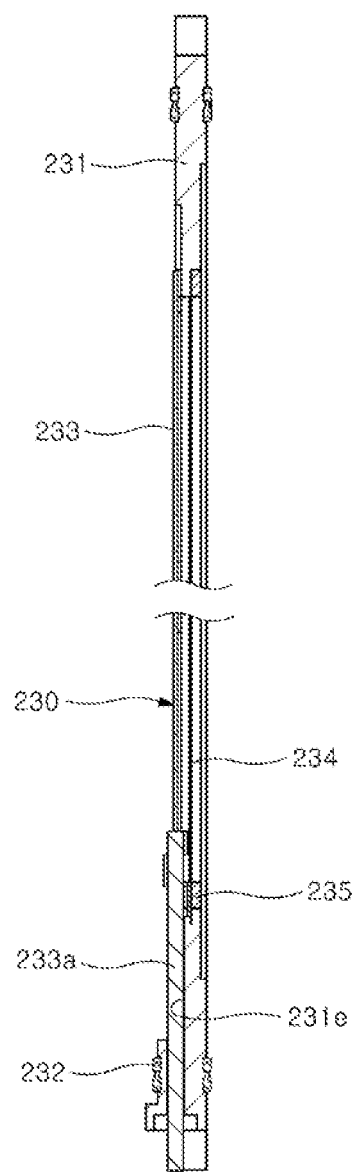
FIG. 8 is a side cross-sectional view illustrating the electrode plate of the electrolyzer cell coupled to the frame, according to the present invention.

In addition, as illustrated in FIG. 8, an electrode plate 233 is fitted into the frame 231. The electrode plate 233 is located on the front portion of the frame 231. An electrode rod 233a is provided on the lower portion of the electrode plate 233, and is fixedly coupled to a coupling hole 231e formed between the first and second inlet holes 231a and 231b of the frame 231.

Since the electrode rod 233a is fixed to the coupling hole 231e, it is possible to remove an insert molding process when fabricating the electrolyzer cells 230, thereby significantly improving a fabrication process.

The diaphragm 234 is located on the rear surface of the frame 231, and is fixed by the fixing frame 235.

The electrolyzer cells 230 configured as described above are at least three electrolyzer cells stacked on each other. When applied to a product, a greater number of electrolyzer cells may be stacked on each other, at the request of customers. An electrolyzer cell 230' is stacked on the rear portion of the electrolyzer cell 230. The electrolyzer cell 230' has the same configuration as that of the electrolyzer cell 230, but first and second inlet holes 231a and 231b and first and second passage holes 231c and 231d of the electrolyzer cell 230' are provided in different orientations from those of the electrolyzer cell 230. The electrolyzer cells 230 and the electrolyzer cells 230' are stacked in an alternating manner.

When the electrolyzer cells 230 and 230' are stacked on each other as described above, water supplied from the input regulator 100 flows in an oblique direction, so that the flow of water is delayed. The delayed flow of water further improves the efficiency of electrolysis.

When the electrolyzer cells 230 and 230' are stacked at the rear of the front plate 210, a rear plate 220 is located at the rear of the electrolyzer cell 230 and is fixed to the electrolyzer cell 230 using bolts and nuts.

Terminals 240 are fixed to the lower portions of the front plate 210 and the electrolyzer cells 230 and 230', such that power is supplied to the electrode plate 233 through the terminals 240.

In addition, the flow switching output unit 300 is fixed to the first and second water outlets 212a and 211a of the electrolyzer module 200. The flow switching output unit 300 discharges alkali water and acidic water decomposed and supplied by the electrolyzer module 200.

The flow switching output unit 300 has a connecting pipe 310. The connecting pipe 310 is configured such that the first discharge pipe 311 is provided on one portion thereof and the second discharge pipe 312 is provided on the other portion thereof. The first discharge pipe 311 is fixed to the first water outlet 212a, while the second discharge pipe 312 is fixed to the second water outlet 211a.

A first discharge hole 311a of the first discharge pipe 311 communicates with a first gate 321a of an outlet body 321, while a second discharge hole 312a of the first discharge pipe 311 communicates with a second gate 321a' of the outlet body 321.

A housing 320 is fixed to the front portion of the connecting pipe 310, and the first and second gates 321a and 321a' penetrate the upper and lower portions of the outlet body 321 of the housing 320.

In addition, a first discharge hole 321b and a second discharge hole 321c penetrate the inner upper portion of the outlet body 321. The first and second discharge holes 321b and 321c communicate with the second gate 321a'.

The first discharge hole 321b' and the second discharge hole 321c' penetrate the inner lower portion of the outlet body 321, and the first and second discharge holes 321b' and 321c' communicate with the first gate 321a.

The first discharge hole 321b communicating with the second gate 321a' and the first discharge hole 321b' communicating with the first gate 321a communicate with each other, and communicate with an acidic water outlet 321e provided in the lower portion of the outlet body 321.

In addition, the second discharge hole 321c communicating with the second gate 321a' and the second discharge hole 321c' communicating with the first gate 321a communicate with an alkaline water outlet 321d.

An upper water stop member 332 is seated on and coupled to the inner upper portion of the outlet body 321 in which the second gate 321a' is provided. A first water stop cap 332a is provided on one portion of the upper water stop member 332 to open and close the first discharge hole 321b, and a second water stop cap 332b is provided on the other portion of the upper water stop member 332 to open and close the second discharge hole 321c.

A lower water stop member 333 is seated on and coupled to the inner lower portion of the outlet body 321 in which the first gate 321a is provided. A first water stop cap 333a is provided on one portion of the lower water stop member 333 to open and close the first discharge hole 321b, and a second water stop cap 333b is provided on the other portion of the lower water stop member 333 to open and close the second discharge hole 321c'.

In addition, a cam shaft 331 is fitted vertically into the central penetrated portions of the upper water stop member 332 and the lower water stop member 333. The upper end portion of the cam shaft 331 is coupled to a rotary shaft 341 of a drive motor 340, and the lower end portion of the cam shaft 331 is inserted into a shaft insertion hole 323a of a lower cap 323.

An upper pressing protrusion 331a is provided on the upper portion of the outer surface of the cam shaft 331. The upper pressing protrusion 331a presses the inner surface of the upper water sop member 332 in one direction. A lower pressing protrusion 331b is provided on the lower portion of the outer surface of the cam shaft 331, in a direction opposite to the direction of the upper pressing protrusion 331a. The lower pressing protrusion 331b presses the inner surface of the lower water stop member 333 in one direction.

In addition, first and second, and third micro switches 350, 360, and 370 are fixed to the upper portion of the outlet body 321. A rotary disc 334 having a pressing protrusion 334a is fixed to the upper portion of the cam shaft 331.

The drive motor 340 rotating the cam shaft 331 is fixed to the upper portion of the outlet body 321, to which the first and second, and third micro switch 350, 360, and 370 are fixed. The rotary shaft 341 of the drive motor 340 is coupled to the upper portion of the cam shaft 331.

The rotary disc 334 coupled to the cam shaft 331 presses contact pieces of the first and second, and third micro switches 350, 360, and 370 while being rotated by the operation of the drive motor 340.

In addition, the connecting shaft 400 is coupled vertically between the input regulator 100 and the flow switching output unit 300.

The connecting shaft 400 includes an upper connecting member 410, a lower connecting member 420, and a spring 430. The upper end portion of the upper connecting member 410 is coupled to the lower end portion of the cam shaft 331 by extending through the shaft insertion hole 323a of the lower cap 323. The lower connecting member 420 is coupled to the inner lower portion of the upper connecting member 410. The lower end portion of the lower connecting member 420 is coupled to the upper end of the rotatable supply member 120.

The spring 430 is mounted between the upper connecting member 410 and the lower connecting member 420 to elastically press the lower connecting member 420 downward, such that the lower connecting member 420 is firmly coupled to the input regulator 100.

The connecting shaft 400, connected to the input regulator 100 and the flow switching output unit 300 as described above, synchronizes the operation of the input regulator 100 and the flow switching output unit 300.

Hereinafter, the operation of the present invention having the above-described configuration will be described in detail.

Figure 9:
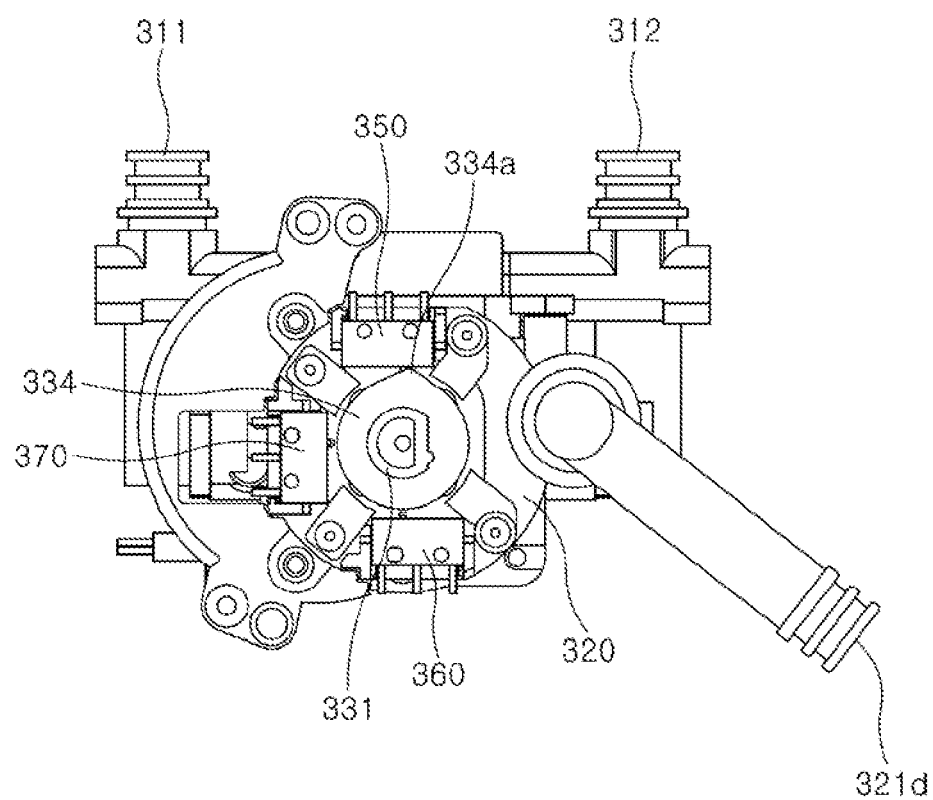
FIGS. 9 to 14 are views illustrating the operating state according to the present invention, in which alkaline water and acidic water are created and output.
Figure 10:
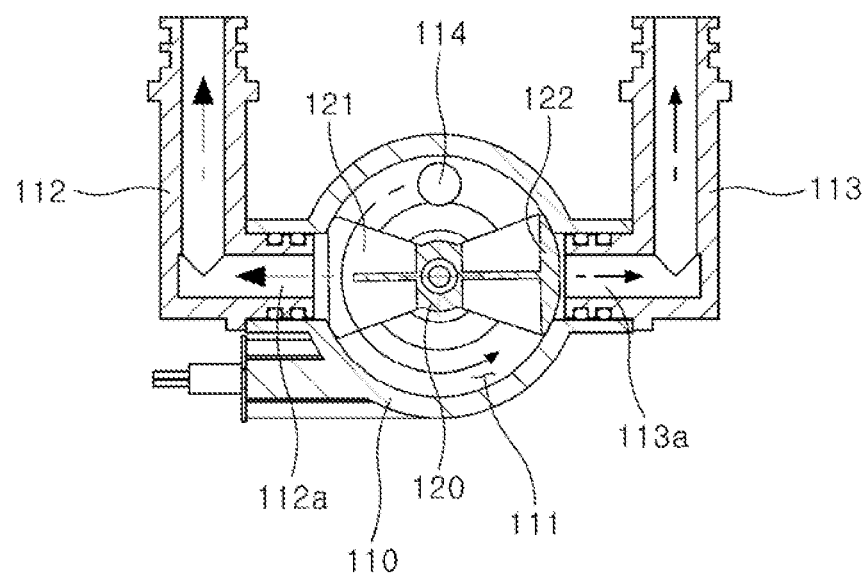
Figure 11:
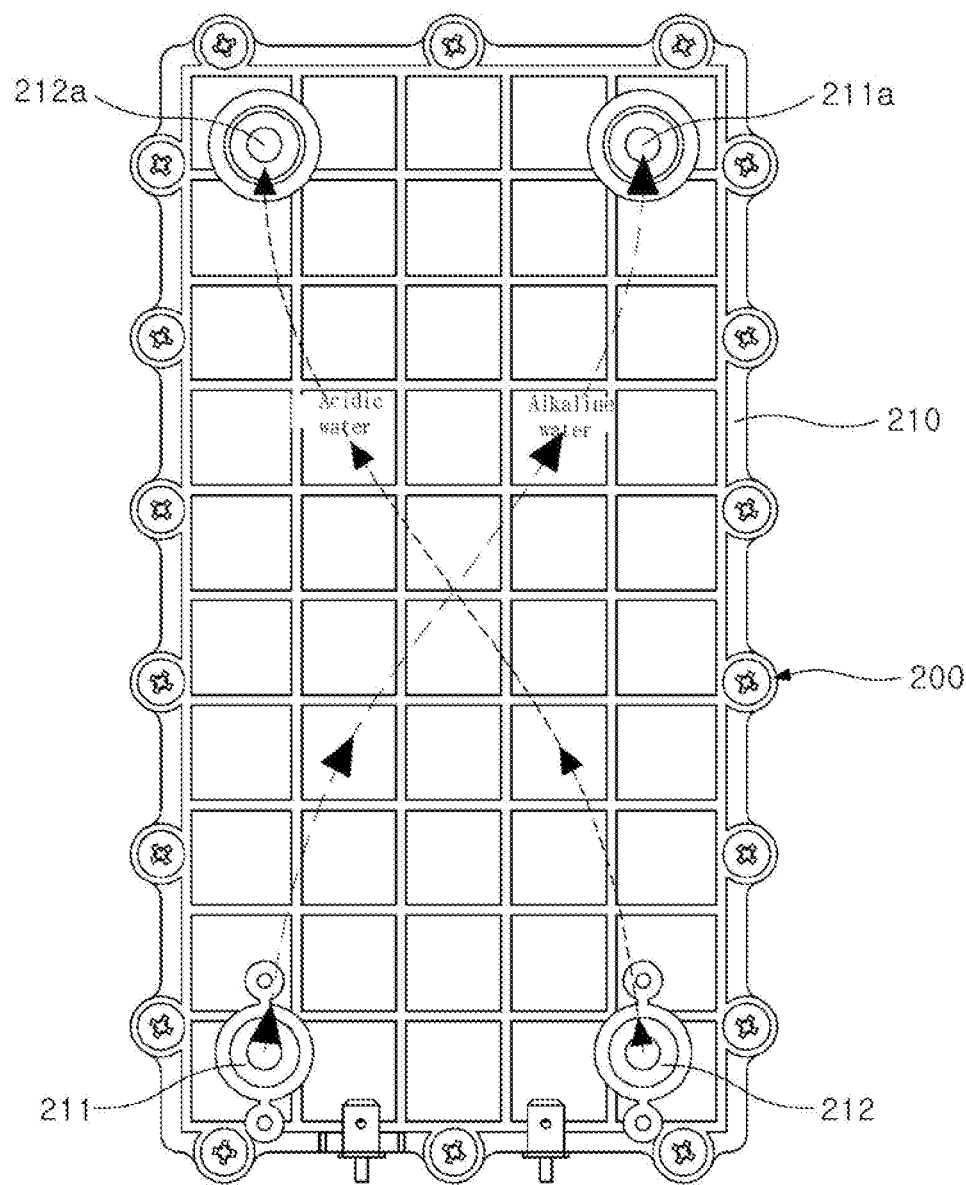
Figure 12:
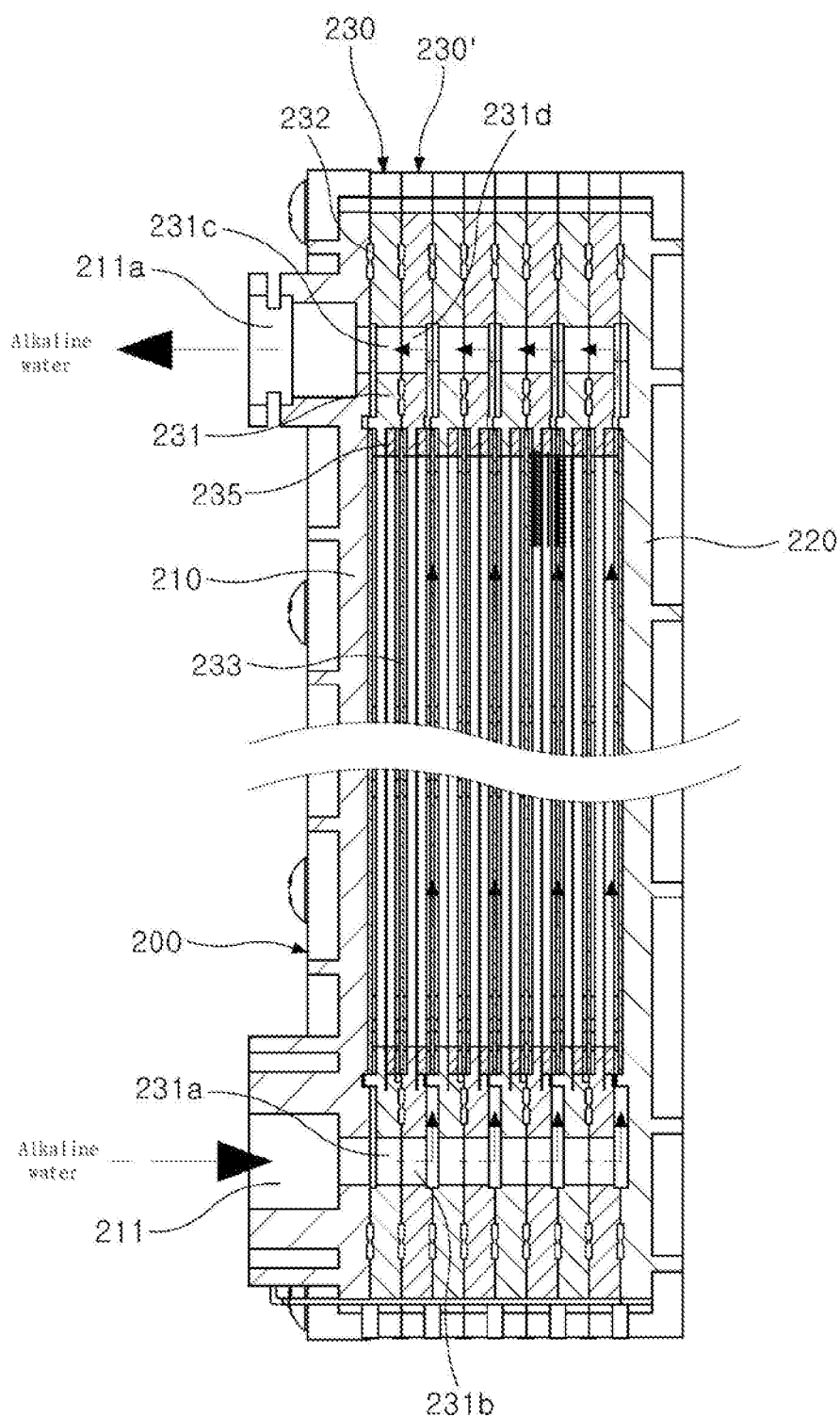
Figure 13:
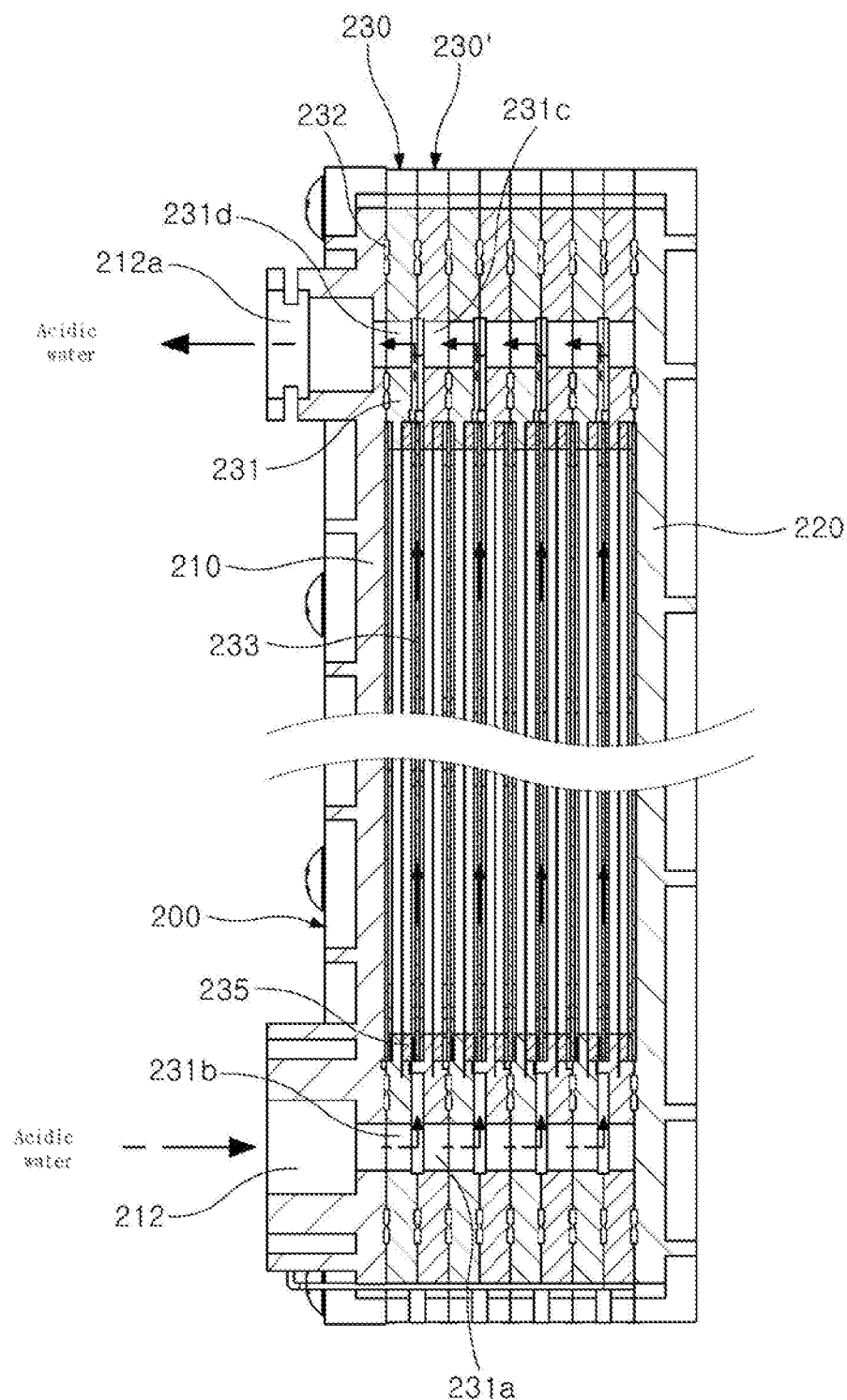
Figure 14:
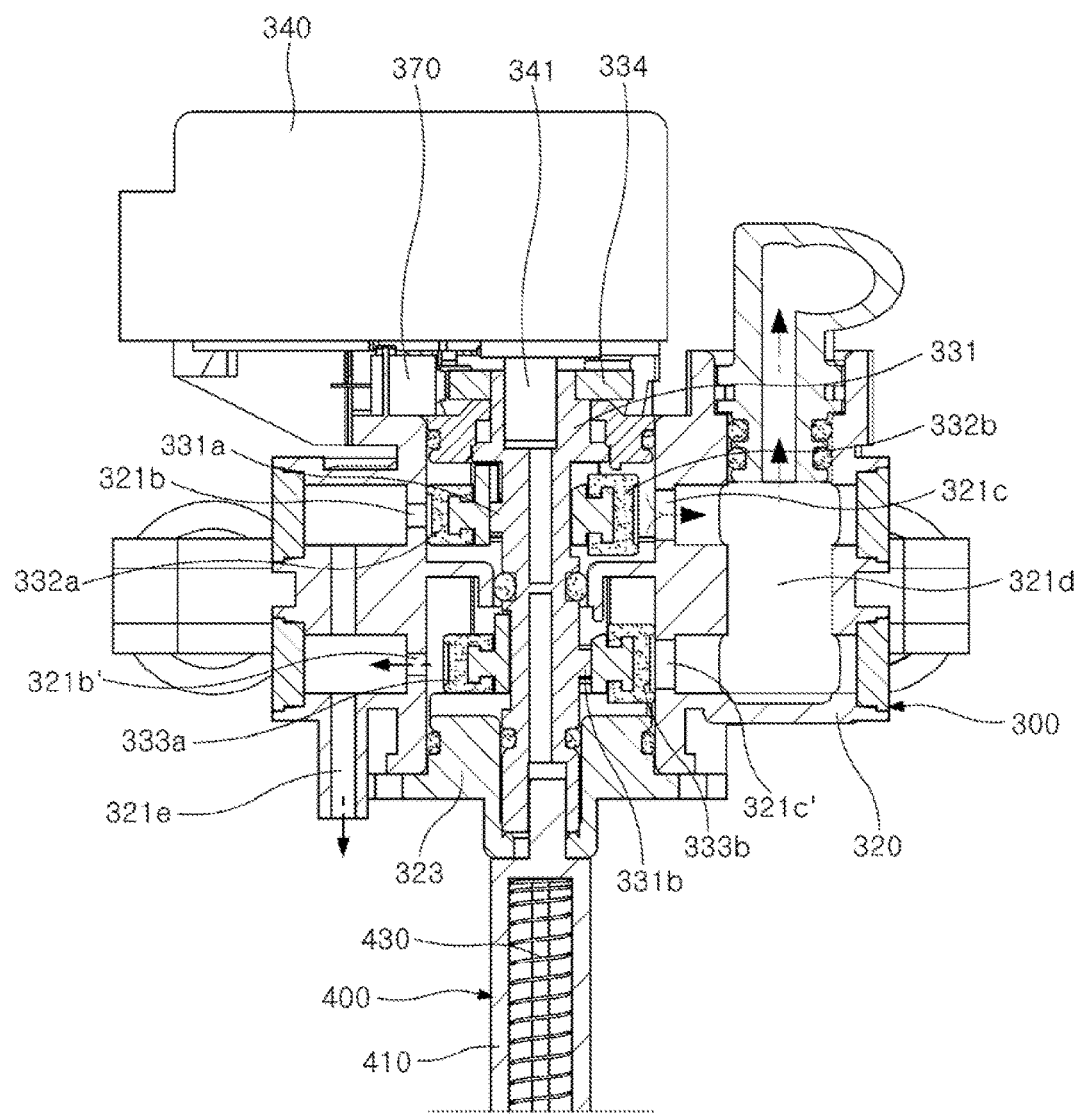
Figure 15:
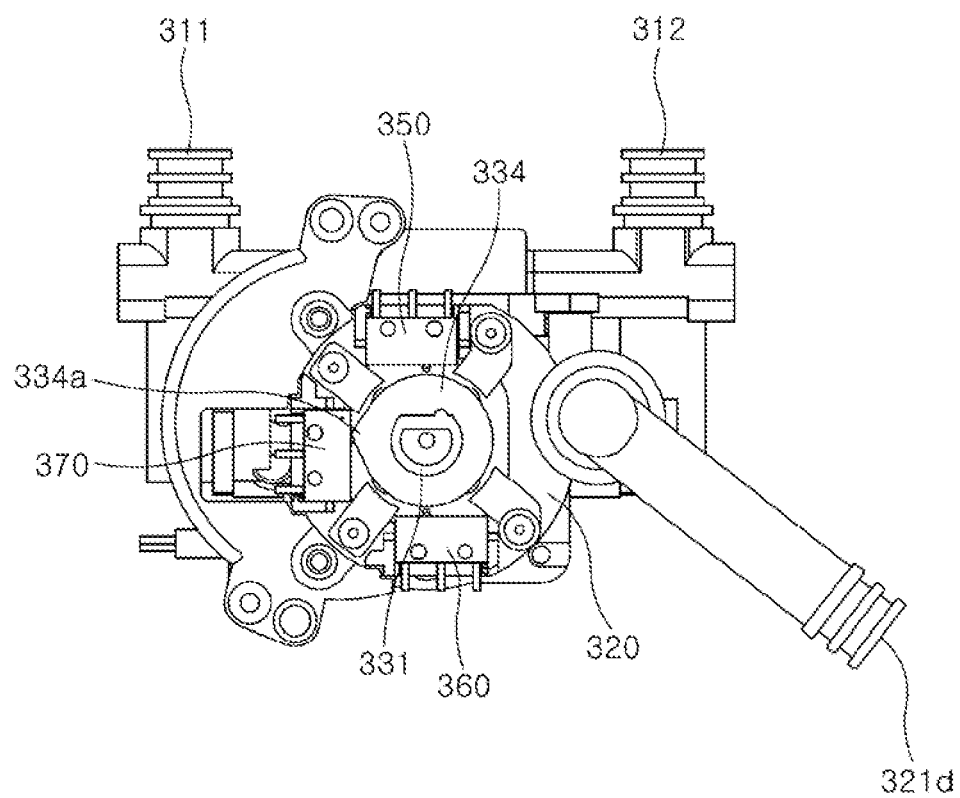
FIGS. 15 to 18 are views illustrating the operating state according to the present invention, in which clean water is output.
Figure 16:
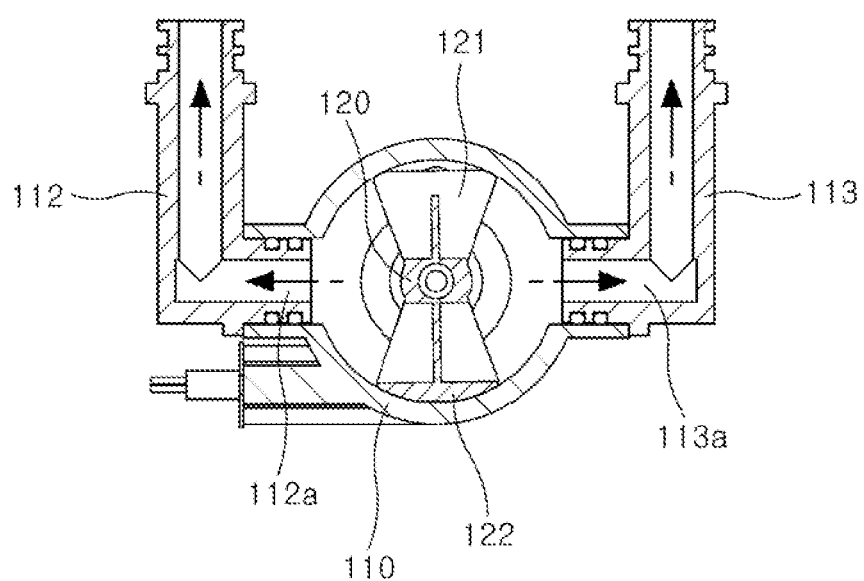
Figure 17:
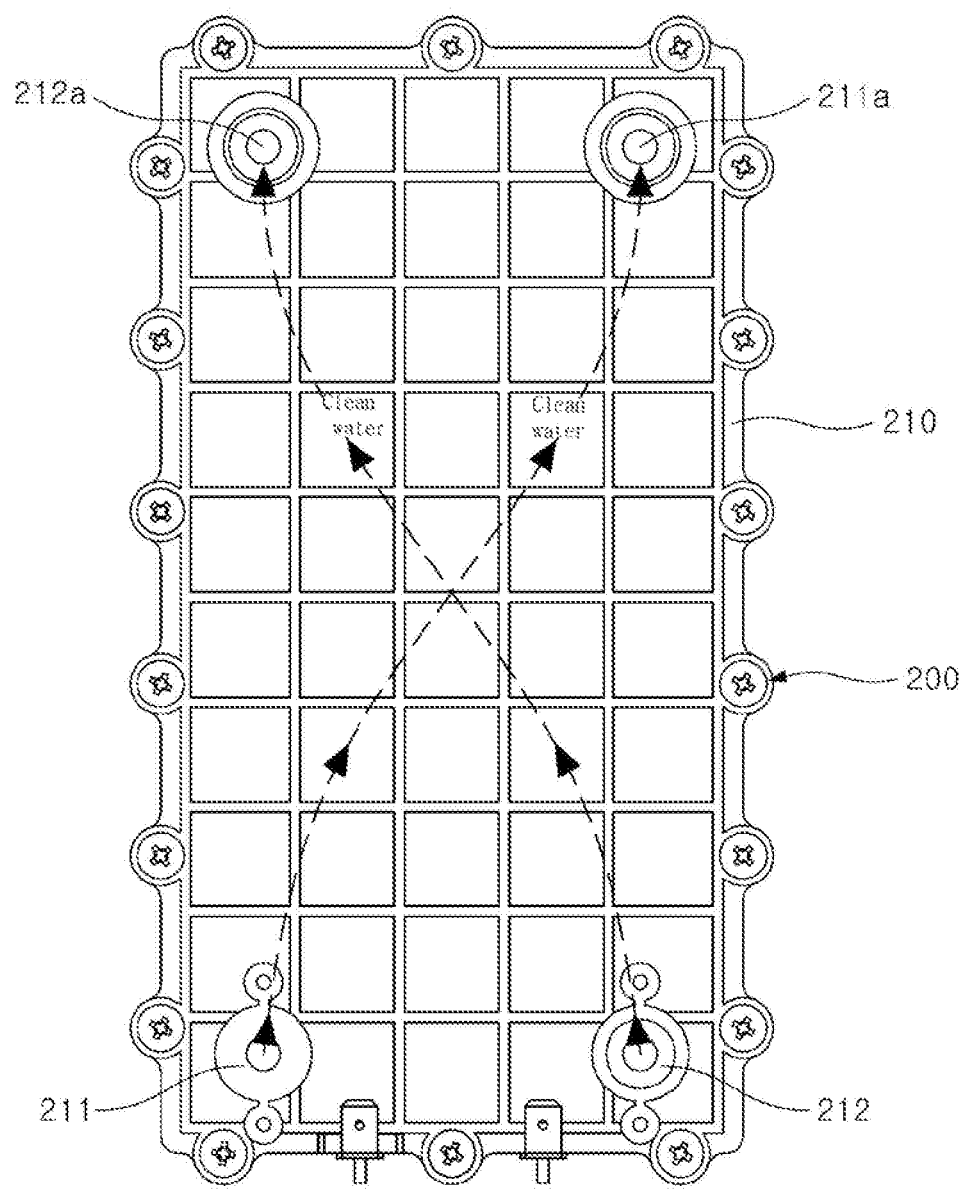
Figure 18:
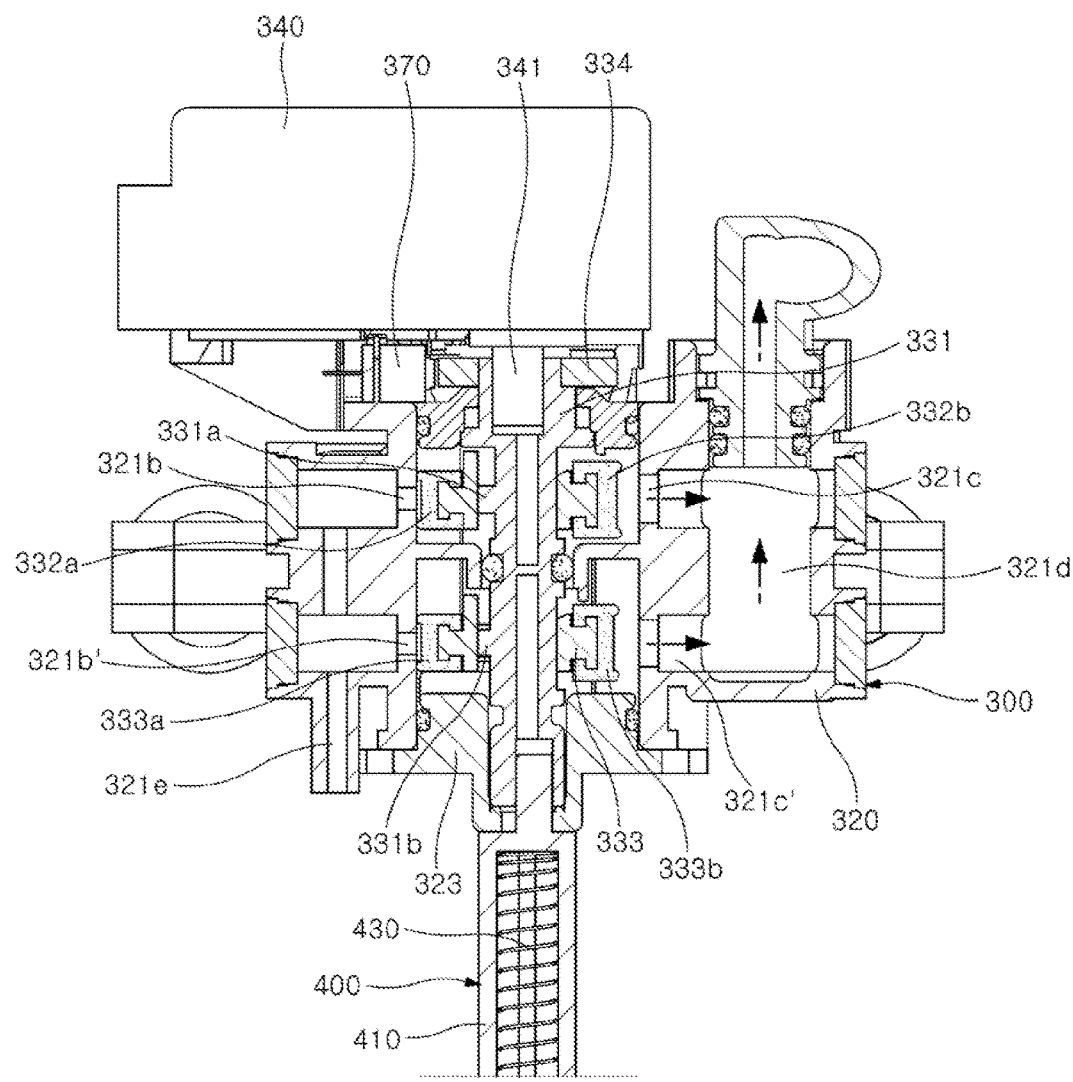
Figure 19:
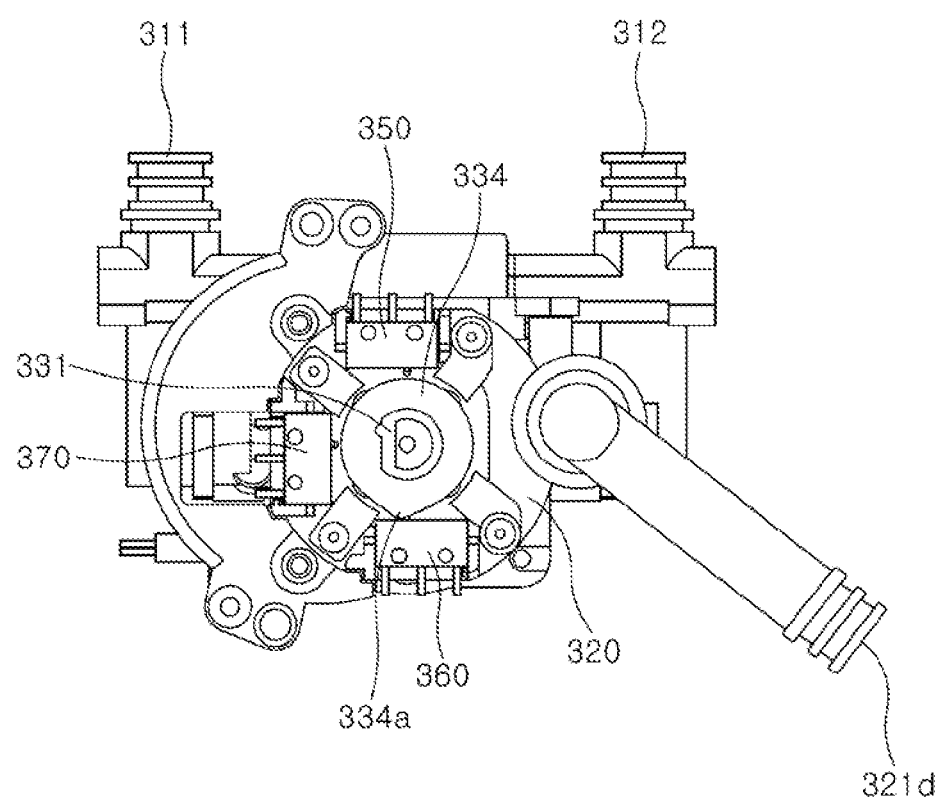
FIGS. 19 to 24 are views illustrating the operating state according to the present invention, in which alkaline water and acidic water are created by supplying water to a cathode chamber and an anode chamber in an alternating manner by changing the polarities of the electrode plate and then alkaline water and acidic water are output.
Figure 20:
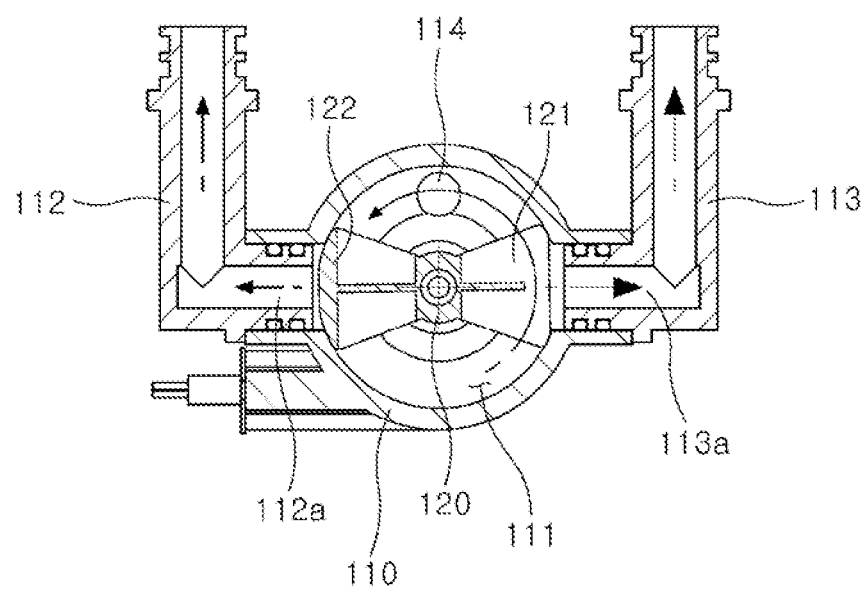
Figure 21:
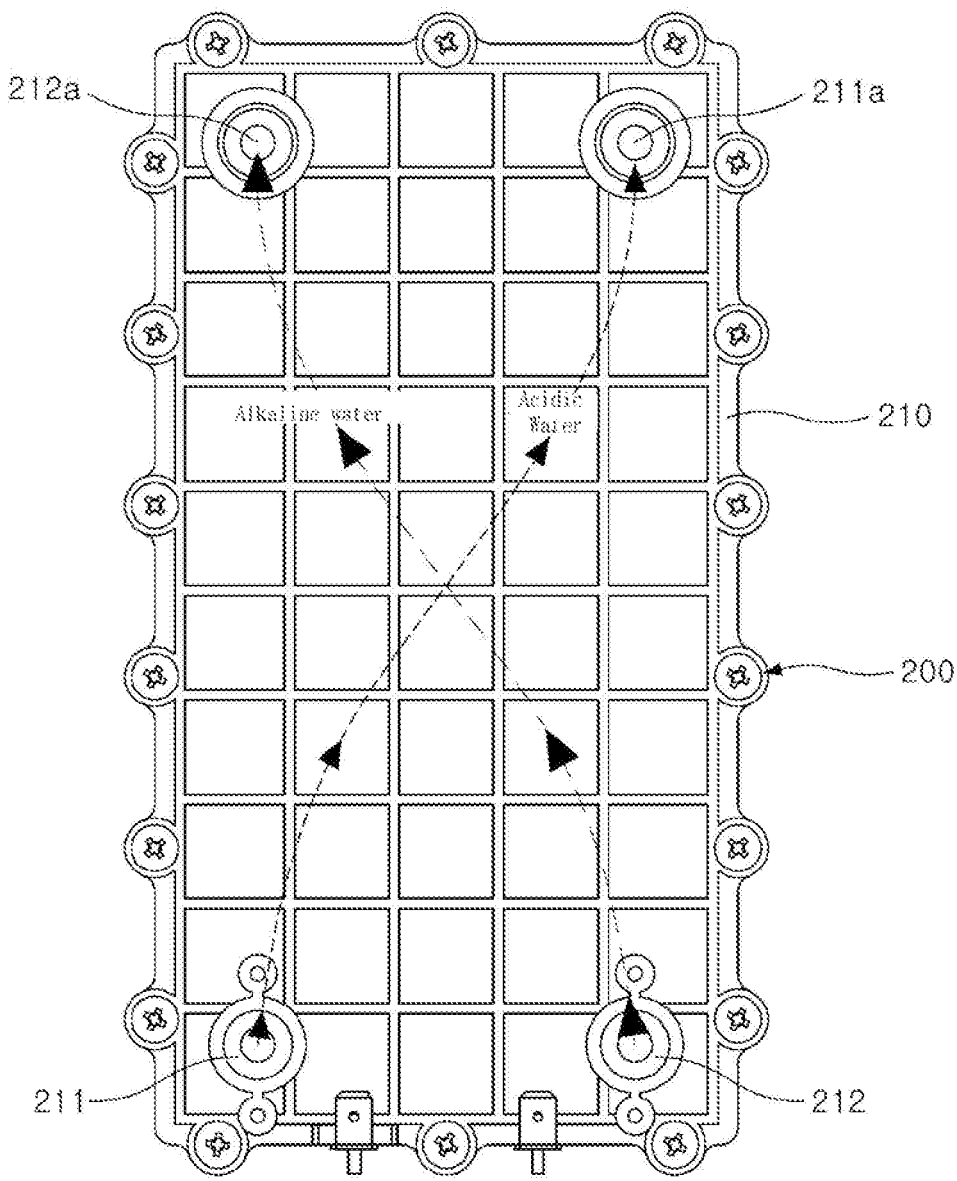
Figure 22:
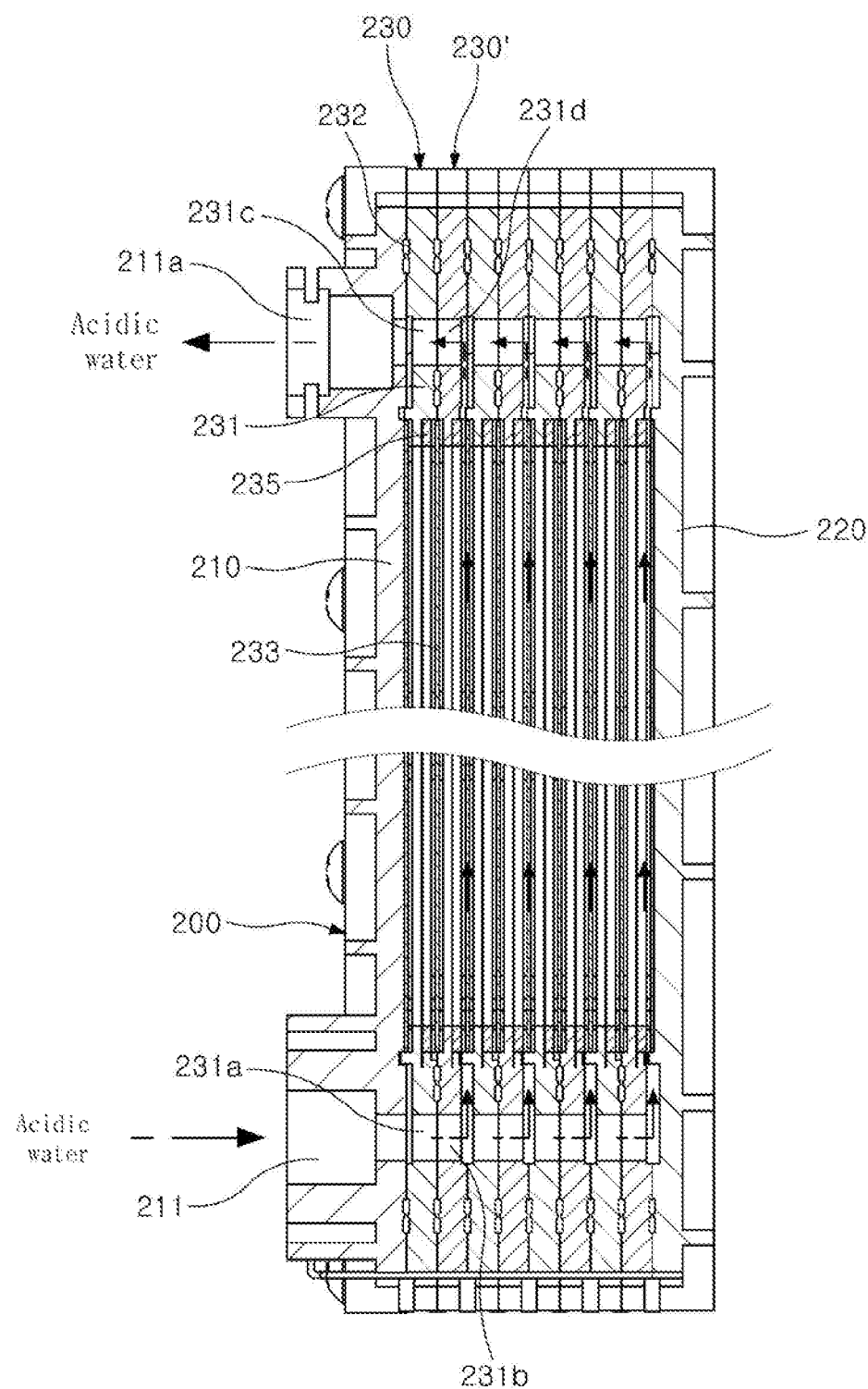
Figure 23:
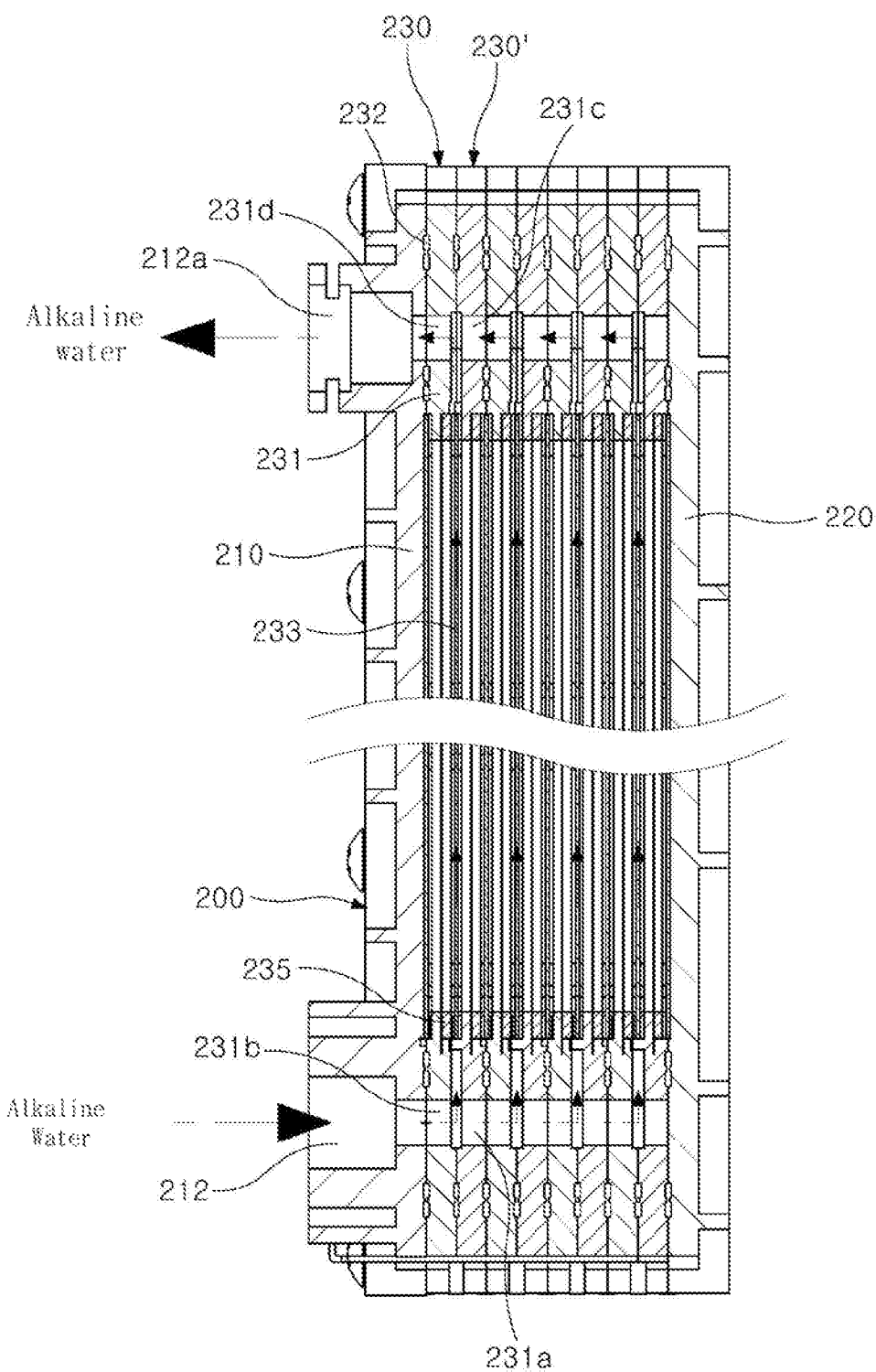
Figure 24:
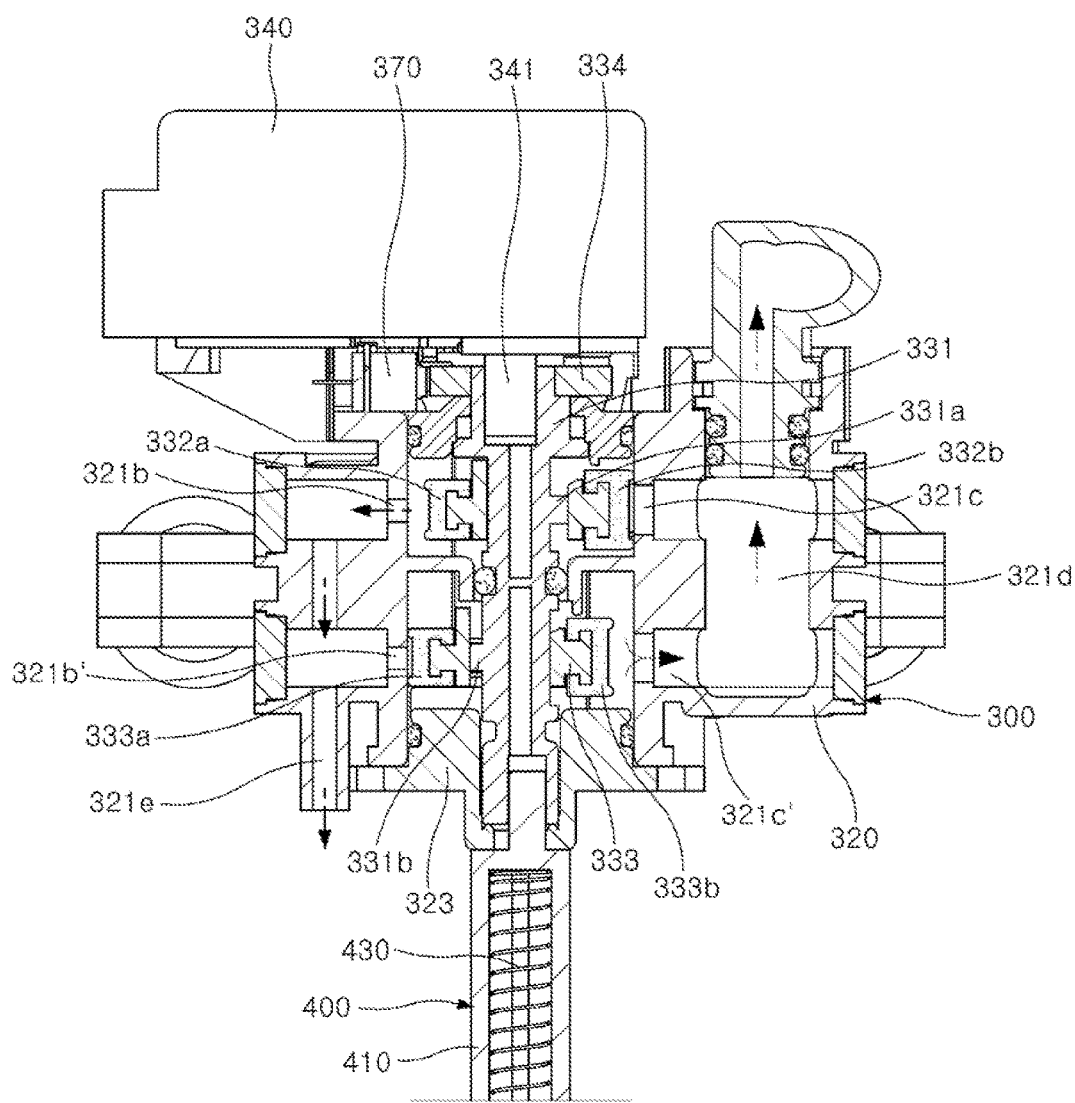

First, as illustrated in FIGS. 9 and 14, when the controller (not shown) of the water ionizer is operated to drink alkaline water, the rotary shaft 341 is rotated by the operation of the drive motor 340 to rotate the cam shaft 331. The connecting shaft 400 connected to the cam shaft 331 is simultaneously rotated, and at the same time, the input regulator 100 connected to the connecting shaft 400 is synchronized.

When the connecting shaft 400 is rotated, the supply passage 121 of the rotatable supply member 120 is directed toward the first supply hole 112a, and at the same time, the supply restraining member 122 is located in the second supply hole 113a. A gap is formed between the supply restraining member 122 and the second supply hole 113a, such that a small amount of water can be supplied through the gap.

That is, the input regulator 100 is set (or configured) such that 80% of water is supplied through the first supply hole 112a to enter the interior of the electrolyzer module 200 and 20% of water is supplied through the second supply pipe 113 to enter the interior of the electrolyzer module 200.

In addition, in response to the rotation of the cam shaft 331, the upper pressing protrusion 331a presses the upper water stop member 332 toward the first discharge hole 321b to close the first discharge hole 321b and open the second discharge hole 321c.

In addition, the lower pressing protrusion 331b presses the lower water stop member 333 toward the second discharge hole 321c' to close the second discharge hole 321c' and open the first discharge hole 321b'.

Here, when the pressing protrusion 334a of the rotary disc 334 presses the contact piece of the first micro switch 350 in response to the rotation of the cam shaft 331, the operation of the drive motor 340 is stopped.

In addition, water introduced into a distribution space 111 through the water supply hole 132 of the input regulator 100 is distributed at a predetermined ratio by the rotatable supply member 120. The ratio between alkaline water and acidic water may be set to be 80:20 by rotating the rotatable supply member 120. The ratio between alkaline water and acidic water may be set at a minimized value (e.g. 90:10 or 99:1) such that the fraction of acidic water to be discarded is less than 20%.

In the following, the ratio between alkaline water and acidic water may be described to be 80:20.

The rotation of the rotatable supply member 120 adjusts the sizes of the supply holes 112a and 113a, thereby distributing alkaline water and acidic water at a ratio 80:20. 80% of water is introduced to the first inlet 211 of the electrolyzer module 200 through the first supply hole 112a, while 20% of water is introduced to the second inlet 212 of the electrolyzer module 200 through the second supply pipe 113.

Water introduced to the first inlet 211 is introduced to the first passage hole 231c in a crossing manner. Negative (−) electrodes are formed in the electrode plate 233 of the electrolyzer cell 230 by a voltage applied thereto, so that water is electrolyzed. At the same time, hydrogen gas generated by the reduction of hydrogen ions is consumed by hydrogen ions in water. Cations of sodium (Na), magnesium (Mg), Calcium (Ca), and the like, other than hydrogen ions, generate hydrogen ion pairs. In this manner, slightly alkaline water is created.

In addition, water introduced to the second inlet 212 is also introduced to the second passage hole 231d in a crossing manner. Positive (+) electrodes are formed in the electrode plate 233 of the electrolyzer cell 230' by a voltage applied thereto, so that water is electrolyzed. At the same time, oxygen gas generated by the reduction of hydroxide ions is consumed by hydroxide ions in water. Anions of chlorine (Cl), phosphorus (P), sulphur (S), and the like, other than hydroxide ions, are acidic, thereby producing acidic water.

Since water introduced to the input regulator 100 flows in a crossing manner within the electrolyzer module 200 as described above, the efficiency of electrolysis can be improved.

Alkaline water electrolyzed as above is discharged to the second discharge pipe 312 of the connecting pipe 310 through the second water outlet 211a of the electrolyzer module 200, while acidic water electrolyzed as above is discharged to the first discharge pipe 311 through the first water outlet 212a of the electrolyzer module 200.

Alkaline water discharged to the second discharge pipe 312 is supplied to the second gate 321a' of the outlet body 321 through the second discharge hole 312a. Since the first discharge hole 321b is closed by the first water stop cap 332a, alkaline water is discharged through the alkaline water outlet 321d while being simultaneously discharged through the second discharge hole 321c.

In addition, acidic water discharged to the first discharge pipe 311 is supplied to the first gate 321a of the outlet body 321 through the first discharge hole 311a. Since the second discharge hole 321c' is closed by the second water stop cap 333b, acidic water is discharged through the acidic water outlet 321e while being simultaneously discharged through the first discharge hole 321b'.

In addition, as illustrated in FIGS. 19 to 24, the polarities of the electrodes applied to the electrode plate of the electrolyzer module are changed to prevent scale from being created within the electrolyzer cell 230 defining the cathode chamber.

First, the drive motor 340 is operated to rotate the connecting shaft 400 under the control of the controller.

When the connecting shaft 400 is rotated, the supply passage 121 of the rotatable supply member 120 communicates toward the second supply hole 113a, and at the same time, the supply restraining member 122 is located in the first supply hole 112a.

That is, the input regulator 100 is set (or configured) such that 80% of water is supplied to the second supply pipe 113 before being introduced into the electrolyzer module 200 and 20% of water is supplied to the first supply hole 112a before being introduced into the electrolyzer module 200.

In addition, in response to the rotation of the cam shaft 331, the upper pressing protrusion 331a presses the upper water stop member 332 toward the second discharge hole 321c, thereby closing the second discharge hole 321c while opening the first discharge hole 321b.

In addition, the lower pressing protrusion 331b presses the lower water stop member 333 toward the first discharge hole 321b', thereby closing the first discharge hole 321b' while opening the second discharge hole 321c'.

Here, when the pressing protrusion 334a of the rotary disc 334 presses the contact piece of the second micro switch 360 in response to the rotation of the cam shaft 331, the operation of the drive motor 340 is stopped.

In addition, as soon as water introduced to the distribution space 111 through the water supply hole 132 of the input regulator 100 is distributed at a ratio 80:20 by the rotatable supply member 120, 20% of water is introduced to the first inlet 211 of the electrolyzer module 200 through the first supply hole 112a while 80% of water is introduced to the second inlet 212 of the electrolyzer module 200 through the second supply pipe 113.

Water introduced to the first inlet 211 is introduced to the first passage hole 231c in a crossing manner. Positive (+) electrodes are created in the electrode plate 233 of the electrolyzer cell 230) by a voltage applied thereto, and alkaline water is created by electrolysis.

In addition, water introduced to the second inlet 212 is introduced to the second passage hole 231d in a crossing manner. Negative (−) electrodes are created on the electrode plate of the electrolyzer cell 230' by a voltage applied thereto, and acidic water is created by electrolysis.

Alkaline water electrolyzed as above is discharged to the first discharge pipe 311 of the connecting pipe 310 through the first water outlet 212a of the electrolyzer module 200, while electrolyzed acidic water is discharged to the second discharge pipe 312 through the second water outlet 211a of the electrolyzer module 200.

Alkaline water discharged to the first discharge pipe 311 is supplied to the first gate 321a of the outlet body 321 through the first discharge hole 311a. Since the first discharge hole 321b' is closed by the first water stop cap 333a, alkaline water is discharged through the alkaline water outlet 321d while being simultaneously discharged through the second discharge hole 321c.

In addition, acidic water discharged to the second discharge pipe 312 is supplied to the second gate 321a' of the outlet body 321 through the second discharge hole 312a. Since the second discharge hole 321c is closed by the second water stop cap 333b, acidic water is discharged through the acidic water outlet 321e while being simultaneously discharged through the first discharge hole 321b.

Accordingly, when the polarities of electrodes, through which voltages are applied to the electrode plate 233 of the electrolyzer module 200, are changed from positive (+) to negative (−) or from negative (−) to positive (+), + ions serving as a reason for scale may be pushed outwards, thereby preventing scale.

In addition, as illustrated in FIGS. 15 to 18, in a case in which water purification is performed by operating a controller (not shown) of the water ionizer, the rotary shaft 341 is rotated by the operation of the drive motor 340 to rotate the cam shaft 331. The input regulator 100 connected to the connecting shaft 400 is synchronized, and at the same time, the connecting shaft 400 connected to the cam shaft 331 is rotated.

When a connecting shaft 140 rotates, the supply passage 121 and the supply restraining member 122 of the rotatable supply member 120 are located perpendicularly to the first and second supply holes 112a and 113a.

That is, the input regulator 100 is set (or configured) such that 50% of clean water is supplied through the first supply hole 112a before being introduced into the electrolyzer module 200 and the same ratio of clean water, i.e. 50% of clean water, is supplied to the second supply pipe 113 before being introduced into the electrolyzer module 200.

In addition, in response to the rotation of the cam shaft 331, the upper pressing protrusion 331a presses the upper water stop member 332 toward the first discharge hole 321b to close the first discharge hole 321b and open the second discharge hole 321c.

In addition, the lower pressing protrusion 331b presses the lower water stop member 333 toward the first discharge hole 321b' to close the first discharge hole 321b' and open the second discharge hole 321c'.

Here, when the pressing protrusion 334a of the rotary disc 334 presses the contact piece of the third micro switch 370 in response to the rotation of the cam shaft 331, the operation of the drive motor 340 is stopped, and the supply of power to the electrode plate 233 of the electrolyzer module 200 is interrupted.

Clean water, introduced to the first inlet 211 of the electrolyzer module 200 through the input regulator 100 after having been filtered by the filter, is introduced to the first passage hole 231c in a crossing manner. When clean water introduced to the second inlet 212 is introduced to the second passage hole 231d in a crossing manner and then passes through the electrolyzer module 200, water is supplied to the first and second gates 321a and 321a' through the first and second discharge pipes 311 and 312 of the connecting pipe 310.

Here, since the first discharge hole 321*b* and 321*b*' are closed, the first water stop cap 332*a* of the upper water stop member 332 and the first water stop cap 333*a* of the lower water stop member 333 are discharged from the alkaline water outlet 321*d* through the second discharge hole 321*c* and 321*c*', so that clean water can be drunk.

The foregoing descriptions and the accompanying drawings have been presented in order to explain certain principles of the present invention by way of example. Those having ordinary knowledge in the technical field to which the present invention relates could make various modifications and variations without departing from the principle of the present invention. The foregoing embodiments disclosed herein shall be interpreted as being illustrative, while not being limitative, of the principle and scope of the present invention. It should be understood that the scope of the present invention shall be defined by the appended Claims and all of their equivalents fall within the scope of the present invention.

What is claimed is:

1. A water ionizer comprising:
    an input regulator distributing water, supplied through a filter and a flow rate sensor, to a first inlet and a second inlet of a stacked electrolyzer;
    an electrolyzer module fixed to a first supply pipe and a second supply pipe of the input regulator to guide water supplied from the input regulator in a crossing manner and electrolyze water into alkaline water and acidic water, wherein water introduced to the first inlet is discharged from a second outlet and water introduced to the second inlet is discharged from a first outlet;
    a flow switching output unit fixed to an upper portion of the electrolyzer module, wherein an output separator of the flow switching output unit rotates in response to an operation of a drive motor to distribute alkaline water and acidic water at a predetermined ratio so as to be discharged through an alkaline water outlet and an acidic water outlet, respectively; and
    a connecting shaft disposed in the input regulator and the flow switching output unit to synchronize operations of the input regulator and the flow switching output unit in response to an operation of a motor,
    wherein the input regulator includes:
    an input body;
    a rotatable supply member disposed within the input body to rotate in response to an operation of the connecting shaft, with a supply passage being provided in one portion of the rotatable supply member and a supply restraining member being provided in the other portion of the rotatable supply member; and
    a cover fixed to an upper portion of the input body to close the input body, wherein a coupling hole is provided in a central portion of the cover, the coupling hole allowing the connecting shaft to be coupled thereto, and a water supply hole is provided at a side of the coupling hole, the water supply hole supplying water into the input body, and
    wherein the inlets are separate from the outlets.

2. The water ionizer according to claim 1, wherein the input body includes:
    a distribution space in which water, supplied from the water supply hole, is distributed at a predetermined ratio;
    a first supply pipe having a first supply hole to supply water, supplied to the distribution space, to the first inlet of the electrolyzer module;
    a second supply pipe having a second supply hole to supply water, supplied to the distribution space, to the second inlet of the electrolyzer module; and
    a discharge hole provided in a lower portion of the distribution space to extend through the bottom portion.

3. The water ionizer according to claim 1, wherein the electrolyzer module includes:
    a front plate having first and second inlets provided in a lower portion thereof and first and second outlets provided in an upper portion thereof, the front plate allowing water supplied from the input regulator to be discharged to the flow switching output unit;
    a rear plate disposed behind the front plate;
    three or more electrolyzer cells stacked between the front plate and the rear plate to electrolyze water while providing crossing flows of water using first and second inlet holes and first and second passage holes provided in a staggered arrangement; and
    terminals disposed on lower portions of the front plate and the electrolyzer cells to supply a voltage to electrode plates of the electrolyzer cells.

4. The water ionizer according to claim 3, wherein each of the electrolyzer cells includes:
    a frame;
    a water stop packing disposed in a front portion of the frame to direct water, introduced through the first inlet hole, to the first passage hole and to direct water, introduced through the second inlet hole, to the second passage hole;
    the electrode plate located in front of the frame and fixedly coupled to a coupling hole of the frame;
    a diaphragm located behind the frame; and
    a fixing frame fixing the diaphragm to the frame.

5. The water ionizer according to claim 4, wherein the frame is configured such that the first and second inlet holes are provided in both lower portions, the first and second passage holes are provided in both upper portions, and the coupling hole to which the electrode plate is coupled is provided between the first and second inlet holes.

6. The water ionizer according to claim 1, wherein the flow switching output unit includes:
    a connecting pipe including a first discharge pipe fixed to a first outlet of the electrolyzer module and a second discharge pipe fixed to a second outlet of the electrolyzer module;
    a housing fixed to a front portion of the connecting pipe, and having the alkaline water outlet and the acidic water outlet through which alkaline water and acidic water are discharged;
    the output separator distributing alkaline water and acidic water, supplied to an accommodation space of the housing, at the predetermined ratio to be discharged through the alkaline water outlet and the acidic water outlet or discharging clean water through the alkaline water outlet;
    a drive motor having a rotary shaft rotating a camp shaft of the output separator; and
    first and second, and third micro switches determining directions in which alkaline water, acidic water, and clean water are discharged, in response to a rotation of a rotary disc driven by the drive motor.

7. The water ionizer according to claim 6, wherein the housing includes:
    an outlet body discharging acidic water and alkaline water, supplied thereto, through the connecting pipe;
    an upper cap disposed on an upper portion of the outlet body to fix the cam shaft; and a lower cap disposed on a lower portion of the outlet body to fix the cam shaft, and having a shaft insertion hole to which the connecting shaft is coupled.

8. The water ionizer according to claim 7, wherein the outlet body includes:
- first and second gates communicating with the first and second outlets of the electrolyzer module;
- a first discharge hole aligned collinearly with and communicating with the first and second gates, such that acidic water is discharged through the first discharge hole;
- a second discharge hole disposed opposite to the first discharge hole, and aligned collinearly with and communicating with the first and second gates, such that alkaline water or clean water is discharged through the second discharge hole; and
- an alkaline water outlet and an acidic water outlet communicating with the first and second discharge holes to discharge alkaline water and acidic water, respectively.

9. The water ionizer according to claim 6, wherein the output separator includes:
- a cam shaft connected to the rotary shaft of the drive motor and the connecting shaft, and having an upper pressing protrusion and a lower pressing protrusion provided in different directions;
- an upper water stop member, wherein the upper pressing protrusion of the cam shaft is located on an inner circumferential surface of the upper water stop member, and the upper water stop member has a first water stop cap provided on one portion and a second water stop cap provided on the other portion;
- a lower water stop member, wherein the lower pressing protrusion of the cam shaft is located on an inner circumferential surface of the upper water stop member, and the lower water stop member has a first water stop cap provided on one portion and a second water stop cap provided on the other portion; and
- the rotary disc disposed on an upper end portion of the cam shaft, and having pressing protrusions to press contact pieces of the first and second, and third micro switches.

10. The water ionizer according to claim 1, wherein the connecting shaft includes:
- an upper connecting member coupled to the cam shaft of the flow switching output unit;
- a lower connecting member coupled to the rotatable supply member of the input regulator; and
- a spring disposed between the upper connecting member and the lower connecting member to elastically fix the lower connecting member to the rotatable supply member.

* * * * *